(12) United States Patent
Abdo

(10) Patent No.: US 11,940,392 B2
(45) Date of Patent: Mar. 26, 2024

(54) MEASUREMENT SCHEME FOR SUPERCONDUCTING QUBITS USING LOW-FREQUENCY MICROWAVE SIGNALS WITHIN A DILUTION REFRIGERATOR

(71) Applicant: International Business Machines Corporation, Armonk, NY (US)

(72) Inventor: Baleegh Abdo, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 16/387,789

(22) Filed: Apr. 18, 2019

(65) Prior Publication Data

US 2020/0333263 A1 Oct. 22, 2020

(51) Int. Cl.
*G01N 22/00* (2006.01)
*G06N 10/00* (2022.01)

(52) U.S. Cl.
CPC ............. *G01N 22/00* (2013.01); *G06N 10/00* (2019.01)

(58) Field of Classification Search
CPC .................................. G01N 22/00; G06N 10/00
See application file for complete search history.

(56) References Cited

U.S. PATENT DOCUMENTS

| 7,719,453 | B2 * | 5/2010 | Kim ...................... H03M 1/146 341/133 |
| 7,889,992 | B1 | 2/2011 | DiVincenzo et al. |
| 7,991,814 | B2 | 8/2011 | Filippov et al. |
| 9,350,460 | B2 | 5/2016 | Paik |
| 9,589,236 | B1 * | 3/2017 | Abdo ....................... G06N 10/00 |
| 9,735,776 | B1 | 8/2017 | Abdo et al. |
| 9,870,536 | B1 | 1/2018 | Abdo |
| 9,892,365 | B2 | 2/2018 | Rigetti et al. |

(Continued)

FOREIGN PATENT DOCUMENTS

| CN | 109327190 A | 2/2019 |
| JP | 2001119300 A | 4/2001 |

(Continued)

OTHER PUBLICATIONS

Du et al; HTS step-edge Josephson junction terahertz harmonic mixer, 2016.*

(Continued)

*Primary Examiner* — Mohamed Charioui
*Assistant Examiner* — Lynda Dinh
(74) *Attorney, Agent, or Firm* — Amin, Turocy & Watson, LLP

(57) ABSTRACT

Techniques that facilitate a measurement scheme for superconducting qubits using low-frequency microwave signals within a dilution refrigerator are provided. In one example, a cryogenic microwave system for measuring superconducting qubits using microwave signals includes a dilution refrigerator system for a quantum processor. The dilution refrigerator system converts a microwave signal associated with qubit information into a reduced-frequency microwave signal based on a Josephson-mixer circuit located within the dilution refrigerator system. The reduced-frequency microwave signal includes a frequency below a qubit frequency and a readout resonator frequency associated with the quantum processor.

13 Claims, 10 Drawing Sheets

(56) References Cited

U.S. PATENT DOCUMENTS

| | | | |
|---|---|---|---|
| 10,230,038 B2 | 3/2019 | Abdo | |
| 2009/0322374 A1 | 12/2009 | Przybysz et al. | |
| 2010/0026537 A1* | 2/2010 | Kirichenko | H03M 3/408 |
| | | | 341/133 |
| 2015/0060190 A1 | 3/2015 | Kuemmeth et al. | |
| 2015/0358022 A1* | 12/2015 | McDermott, III | G06N 10/00 |
| | | | 326/5 |
| 2016/0292587 A1 | 10/2016 | Rigetti et al. | |
| 2017/0091646 A1* | 3/2017 | Abdo | H01P 1/38 |
| 2018/0003753 A1* | 1/2018 | Bishop | G06N 10/00 |
| 2018/0017603 A1 | 1/2018 | Goto | |
| 2018/0091141 A1* | 3/2018 | Abdo | G06N 10/00 |
| 2018/0138987 A1 | 5/2018 | Sliwa et al. | |
| 2018/0260732 A1* | 9/2018 | Bloom | H03K 19/195 |
| 2019/0042967 A1* | 2/2019 | Yoscovits | H01L 29/66977 |
| 2019/0044051 A1* | 2/2019 | Caudillo | H01L 27/18 |

FOREIGN PATENT DOCUMENTS

| | | |
|---|---|---|
| WO | 2015057839 A1 | 4/2015 |
| WO | 2020/212092 A1 | 10/2020 |

OTHER PUBLICATIONS

Gao et al., Noise and conversion performance of a high-Tc superconducting Josephson junction mixer at 0.6 THz. 2017.*

Abdo et al, Multi-path interferometric Josephson directional amplifier for qubit readout, Jan. 2018.*

Polonsky, RSFQ: What we know and what we don't, 1996.*

Flurin, The Josephson mixer: a swiss army nife for microwave quantum optics, Feb. 2019.*

International Search Report and Written Opinion for International Application Serial No. PCT/EP2020/057989 dated Jun. 25, 2020, 16 pages.

Bronn et al., "Fast, high-fidelity readout of multiple qubits", Journal of Physics: Conference Series, vol. 834, XP055698348, ISSN: 1742-6588, DOI: 10.1088/1742-6596/834/1/012003, May 2, 2017, pp. 1-10.

Maezawa et al., "Rapid single flux quantum digital-to-analog converter for ac voltage standard", Physica C, vol. 426, XP029169058, ISSN: 0921-4534, DOI: 10.1016/J.PHYSC.2005.02.130, 2005, pp. 1674-1679.

Abdo et al., "Josephson Directional Amplifier for Quantum Measurement of Superconducting Circuits", Physical Review Letters, vol. 112, No. 16, XP055395583, ISSN: 0031-9007, DOI: 10.1103/PhysRevLett.112.167701, Apr. 1, 2014, pp. 1-5.

Reilly, David J., "Engineering the quantum-classical interface of solid-state qubits", NPJ Quantum Information, vol. 1, No. 1, XP055698323, DOI: 10.1038/npjqi.2015.11, Oct. 27, 2015, pp. 1-10.

Abdo, et al., "Active protection of a superconducting qubit with an interferometric Josephson isolator," arXiv:1810.07234v1 [quant-ph] Oct. 16, 2018, 19 pages.

Abdo, et al., "Non-degenerate, three-wave mixing with the Josephson ring modulator," arXiv:1208.3142v1 [cond-mat.supr-con] Aug. 15, 2012, 21 pages.

Abdo, et al., "Multi-Path Interferometric Josephson Directional Amplier for Qubit Readout," arXiv:1710.02521v1 [physics.ins-det] Oct. 8, 2017, 17 pages.

Conway Lamb, et al., "An FPGA-based Instrumentation Platform for use at Deep Cryogenic Temperatures," arXiv:1509.06809v2 [physics.ins-det] Sep. 29, 2015, 8 pages.

Kirichenko, et al., "Zero Static Power Dissipation Biasing of RSFQ Circuits," IEEE Transactions on Applied Superconductivity, vol. 21, No. 3, Jun. 2011, 4 pages.

Leonard, Jr., et al., "Digital coherent control of a superconducting qubit," arXiv:1806.07930v1 [quant-ph] Jun. 20, 2018, 13 pages.

McDermott, et al., "Quantum-Classical Interface Based on Single Flux Quantum Digital Logic," arXiv:1710.04645v1 [quant-ph] Oct. 12, 2017, 16 pages.

Mukhanov, et al., "Superconductor Analog-to-Digital Converters," Proceedings of the IEEE, vol. 92, No. 10, Oct. 2004, 21 pages.

Mukhanov, "Energy-Efficient Single Flux Quantum Technology," IEEE Transactions on Applied Superconductivity, vol. 21, No. 3, Jun. 2011, 10 pages.

Grimm, "Josephson photonics: Statistics of photons emitted by inelastic Cooper pair tunneling," Submitted on Feb. 15, 2016, https://tel.archives-ouvertes.fr/tel-01274276, 164 pages.

Sarwana, et al., "Dual-Band ADC Utilizing Switch Matrix," IEEE Transactions on Applied Superconductivity, vol. 19, No. 3, Jun. 2009, 4 pages.

Vernik, et al., "Superconducting High-Resolution Low-Pass Analog-to-Digital Converters," IEEE Transactions on Applied Superconductivity, vol. 17, No. 2, Jun. 2007, 4 pages.

Abdo, "Coupling Surface Acoustic Wave Resonators to a Josephson Ring Modulator," U.S. Appl. No. 16/048,935, filed Jul. 30, 2018, 54 pages.

Abdo, "Applications of Surface Acoustic Wave Resonators Coupled to a Josephson Ring Modulator," U.S. Appl. No. 16/049,006, filed Jul. 30, 2018, 67 pages.

Abdo, "Superconducting Device That Mixes Surface Acoustic Waves and Microwave Signals," U.S. Appl. No. 16/048,992, filed Jul. 30, 2018, 51 pages.

Abdo, "Applications of a Superconducting Device That Mixes Surface Acoustic Waves and Microwave Signals," U.S. Appl. No. 16/048,979, filed Jul. 30, 2018, 67 pages.

Abdo, "Multi-Path Interferometric Josephson Isolator Based on Nondegenerate Three Wave Mixing Josephson Devices," U.S. Appl. No. 15/797,929, filed Oct. 30, 2017, 76 pages.

Examination Report received for AU Patent Application Serial No. 2020259653 dated Aug. 31, 2022, 3 pages.

Notice of Acceptance received for Australian Patent Application Serial No. 2020259653 dated Jul. 25, 2023, 31 pages.

Communication pursuant to Article 94(3) EPC for EP Application No. 20713614.4, dated Sep. 5, 2023.

Notice of Reasons for Refusal received for Japanese Patent Application Serial No. 2021-552612 dated Sep. 27, 2023, 20 pages(Including English Translation).

Response to the communication received for European Patent Application Serial No. 20713614.4 dated Dec. 12, 2023, 2 pages.

* cited by examiner

MEASUREMENT SCHEME FOR SUPERCONDUCTING QUBITS USING LOW-FREQUENCY MICROWAVE SIGNALS WITHIN A DILUTION REFRIGERATOR

BACKGROUND

The subject disclosure relates to quantum hardware, and more specifically, to superconducting devices for quantum computing.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, methods, apparatus and/or computer program products that facilitate a measurement scheme for superconducting qubits using low-frequency microwave signals within a dilution refrigerator are described.

According to an embodiment, a cryogenic microwave system for measuring superconducting qubits using microwave signals can comprise a dilution refrigerator system for a quantum processor. The dilution refrigerator system can convert a microwave signal associated with qubit information into a reduced-frequency microwave signal based on a Josephson-mixer circuit located within the dilution refrigerator system. The reduced-frequency microwave signal can comprise a frequency below a qubit frequency and a readout resonator frequency associated with the quantum processor.

According to another embodiment, a system can comprise a dilution refrigerator system for a quantum processor. The dilution refrigerator system can decrease and increase a frequency of a microwave signal associated with a qubit readout to provide a qubit measurement associated with the quantum processor.

According to yet another embodiment, a method is provided. The method can comprise converting, by a dilution refrigerator system associated with a quantum processor, a microwave signal into a reduced-frequency microwave signal based on a Josephson-mixer circuit located within the dilution refrigerator system. The method can also comprise digitizing, by the dilution refrigerator system, the reduced-frequency microwave signal into a digital signal that comprises qubit information associated with the quantum processor. Furthermore, the method can comprise transmitting, by the dilution refrigerator system, the digital signal to a classical computing system.

According to yet another embodiment, a system can comprise a Josephson mixer circuit and a rapid single flux quantum (RSFQ) analog-to-digital converter (ADC). The Josephson mixer circuit can convert a first microwave signal associated with quantum information generated by a quantum processor into a second microwave signal, wherein a first frequency associated with the first microwave signal is greater than a second frequency associated with the second microwave signal. The RSFQ ADC can digitize the second microwave signal based on a superconducting device to generate a digital signal for a classical computing system.

According to yet another embodiment, a system can comprise a quantum processor and a dilution refrigerator system. The dilution refrigerator system can decrease a frequency of a first microwave signal associated with a qubit readout via a Josephson mixer circuit to generate a second microwave signal. The dilution refrigerator system can also digitize the second microwave signal via a rapid single flux quantum (RSFQ) analog-to-digital converter (ADC) to generate a digital signal for a classical computing system.

DETAILED DESCRIPTION

Figure 1:
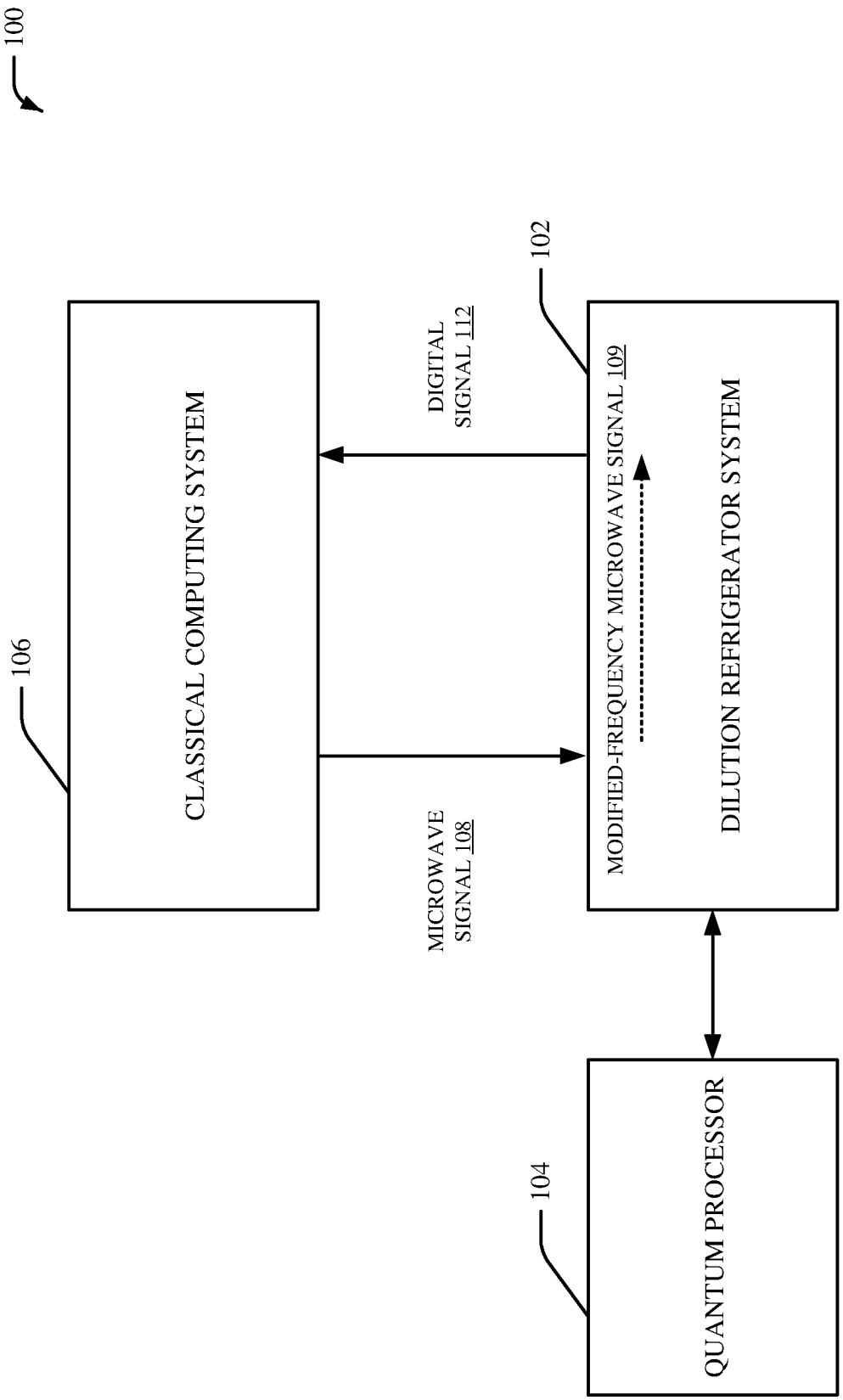
FIG. 1 illustrates an example, non-limiting system associated with a dilution refrigerator system, a quantum processor and a classical computing system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A superconductor device can be a device that provides zero electrical resistance below a certain temperature. A superconducting device can be employed, for example, as a qubit for a superconducting quantum processor. A superconducting quantum processor can be controlled and/or measured using one or more microwave signals in a frequency range between, for example, 4 GigaHertz (GHz) and 10 GHz. Furthermore, a superconducting quantum processor can be mounted on a dilution refrigerator that can be cooled to millikelvin temperatures. In one example, a superconducting quantum processor can be mounted on a base stage of a dilution refrigerator. A superconducting quantum processor can be cooled down to millikelvin temperatures to, for example, operate the superconducting quantum processor in a superconducting regime. For instance, to operate effectively, a temperature of a superconducting quantum processor needs to be below a critical temperature of superconducting materials employed in the superconducting quantum processor. In an example, a superconducting quantum processor that employs aluminum-based Josephson junctions needs to be cooled below a critical temperature of aluminum (e.g., a temperature approximately equal to 1.2 Kelvin(K)) to operate effectively. Additionally or alternatively, a superconducting quantum processor can be cooled down to millikelvin temperatures to, for example, suppress thermal noise in superconducting microwave circuits of the superconducting quantum processor below energy levels of microwave photon excitations of the superconducting microwave circuits. To achieve such ultra-low temperatures for a superconducting quantum processor, black-body radiation noise and/or electromagnetic noise needs to be blocked from reaching the superconducting quantum processor. Black-body radiation noise and/or electromagnetic noise can come from outside the dilution refrigerator (e.g., from a room-temperature environment) and/or from higher-temperature stages within the dilution refrigerator (e.g., a 4 K stage within the dilution refrigerator). Generally, to reduce black-body radiation noise and/or electromagnetic noise, multiple electromagnetic and/or black-body radiation shields can be incorporated within the dilution refrigerator. Additionally or alternatively, to reduce black-body radiation noise and/or electromagnetic noise, different stages of the dilution refrigerator can be thermally isolated. Additionally or alternatively, to reduce black-body radiation noise and/or electromagnetic noise, input lines within the dilution refrigerator (e.g., input lines which carry microwave signals from room-temperature electronics to the superconducting quantum processor) can incorporate lossy coax cables, attenuators, and/or filters. Additionally or alternatively, to reduce black-body radiation noise and/or electromagnetic noise, output lines inside the dilution refrigerator (e.g., output lines which carry microwave signals from the superconducting quantum processor to room-temperature electronics outside the dilution refrigerator) can incorporate filters and/or directional devices such as isolators, circulators, semiconductor-based transistors, etc. However, reducing black-body radiation noise and/or electromagnetic noise for a superconducting quantum processor associated with a dilution refrigerator generally requires large hardware overhead. Furthermore, reducing black-body radiation noise and/or electromagnetic noise for a superconducting quantum processor associated with a dilution refrigerator generally introduces a large amount of heat load within the dilution refrigerator. Reducing black-body radiation noise and/or electromagnetic noise for a superconducting quantum processor associated with a dilution refrigerator generally consumes a large amount of power. As such, reducing black-body radiation noise and/or electromagnetic noise for a superconducting quantum processor associated with a dilution refrigerator can be improved.

To address these and/or other issues, embodiments described herein include systems, methods, and/or computer program products that facilitate an improved dilution refrigerator system for a superconducting quantum processor. For instance, a novel measurement scheme for superconducting qubits using low-frequency microwave signals within a dilution refrigerator is provided herein. In an embodiment, a high-frequency output readout microwave signal carrying qubit information can be downconverted to a relatively low-frequency microwave signal. As used herein, a "high-frequency" microwave signal can be approximately 8 GHz or higher. Furthermore, as used herein, a "low-frequency" microwave signal can be approximately in a frequency range between 0.5 GHz and 2 GHz (e.g., below a qubit frequency and/or a readout resonator frequency). The high-frequency output readout microwave signal can be a microwave signal received by a dilution refrigerator associated with a quantum processor (e.g., a superconducting quantum processor). A downconversion process for the high-frequency output readout microwave signal can be lossless and/or coherent. Furthermore, a downconversion process for the high-frequency output readout microwave signal can be performed using a set of Josephson mixers. The set of Josephson mixers can be, for example, dissipation-less three-wave Josephson mixers. A qubit readout signal transmitted by a readout resonator can also be amplified using, for example, a quantum-limited amplifier or a near quantum-limited amplifier at a base stage of the dilution refrigerator. The amplification of the qubit readout signal can be performed on an original qubit readout signal (e.g., before the downconversion process). Alternatively, amplification of the qubit readout signal can be performed on a downconverted qubit readout signal (e.g., after the downconversion process). The original qubit readout signal can be amplified, for example, using a Josephson directional amplifier that employs a flux-bias and/or a microwave drive. The downconverted qubit readout signal can be amplified, for example, using a direct current superconducting quantum interference device (DC-SQUID) amplifier that employs a direct current (DC) and/or a flux bias. In certain embodiments, a Josephson-based isolator or Josephson-based circulator can be implemented between a qubit-resonator system and a directional amplifier of the dilution refrigerator to, for example, block excess backaction of the directional amplifier on the qubit. The Josephson-based isolator and/or the Josephson-based circulator can employ a flux-bias and/or a microwave drive. In certain embodiments, a bandpass filter and/or a high-pass filter can be implemented between a qubit-resonator system and a downconversion stage on an output line of the dilution refrigerator. The bandpass filter and/or the high-pass filter can transmit the high-frequency readout signal with minimal insertion loss. The bandpass filter and/or the high-pass filter can also block DC-signals and microwave signals below a threshold frequency, where the threshold frequency is below the high-frequency readout signal. In certain embodiments, a low-pass filters and/or a frequency-dependent attenuator can be implemented on an output line of the dilution refrigerator at one or more different stages between a base stage of the dilution refrigerator and a 4 K stage of the dilution refrigerator. As such, the downconverted qubit readout signal can be transmitted through an output chain with little or no attenuation. Signals and/or noise at frequencies above a frequency of the downconverted qubit readout signal can also be attenuated.

In an embodiment, a rapid single flux quantum (RSFQ) analog-to-digital converter (ADC) can be implemented in a 4 K stage of the dilution refrigerator. The RSFQ ADC can sample and digitize the downconverted qubit readout signal. In an aspect, output of the RSFQ ADC can be a digital signal that is transmitted to a classical computing system. The classical computing system can include a room-temperature processing unit for classical signal processing and/or classical signal analysis. Additionally or alternatively, the digital signal can be transmitted to a RSFQ logic located at the 4 K stage of the dilution refrigerator. In certain embodiments, an energy-efficient RSFQ (ERSFQ) circuit can additionally or alternatively be implemented in a 4 K stage of the dilution refrigerator. In certain embodiments, an energy-efficient single flux quantum (eSFQ) circuit can additionally or alternatively be implemented in a 4 K stage of the dilution refrigerator. In certain embodiments, input lines for the dilution refrigerator can incorporate microwave attenuators and/or filters in embodiments where the high-frequency microwave readout signal is approximately equal to a resonance frequency of a readout resonator of a qubit inside the dilution refrigerator system. In certain embodiments, input lines for the dilution refrigerator can incorporate microwave attenuators and/or filters that attenuate high-frequency microwave signals and/or noise above a threshold frequency in embodiments where the high-frequency microwave signals and/or noise are detuned with respect to a resonance frequency of a readout resonator of the dilution refrigerator. The threshold frequency can be below the resonance frequency of the readout resonator. In certain embodiments, an upconversion stage can be implemented to a base stage of the dilution refrigerator to upconvert the low-frequency microwave qubit readout signal to a high-frequency microwave qubit readout signal that is approximately equal to a resonance frequency of a readout resonator of the dilution refrigerator. An upconversion process associated with the upconversion stage can be performed using a set of Josephson mixers. The set of Josephson mixers can be, for example, dissipation-less three-wave Josephson mixers that employ a flux-bias and microwave drive. In one example, the set of Josephson mixers can employ Josephson ring modulators that are coupled to lumped-element microwave resonators and surface acoustic wave (SAW) resonators. In certain embodiments, separate input lines for qubit control can be employed. In certain embodiments, microwave pump lines inside the dilution refrigerator can be attenuated for noise at frequencies higher than or lower than respective pump frequencies. The microwave pump lines can carry microwave drives required for the operation of Josephson mixers, Josephson-based directional amplifiers, Josephson-based isolators, and/or Josephson-based circulators inside the dilution refrigerator. In certain embodiments, the pump lines can be attenuated by employing bandpass filters on the pump lines which minimally attenuate pumps signals (e.g., in-band signals) and heavily attenuate other signals (e.g., out-of-band signals). As such, hardware overhead for a dilution refrigerator system associated with a quantum processor can be reduced. For example, a dilution refrigerator system associated with a quantum processor can be implemented without cryogenic magnetic-based circulators, isolators and/or transistors (e.g., high electron mobility transistors). Furthermore, no microwave mixers are needed at room-temperature on readout lines. The reduced hardware overhead can also promote scalability for the dilution refrigerator system. Additionally, heat load and/or mass load within a dilution refrigerator can be reduced. Power consumption for a dilution refrigerator system associated with a quantum processor can also be reduced. In addition, input lines for a dilution refrigerator and/or output lines for a dilution refrigerator can include attenuators which attenuate black-body radiation noise and/or electromagnetic noise. Synthesizing and/or sampling of low-frequency microwave signals in a dilution refrigerator system associated with a quantum processor can also reduce complexity of the dilution refrigerator system. Moreover, an improved superconducting device, an improved quantum processor (e.g., an improved superconducting quantum processor), and/or improved quantum computing system can be provided.

FIG. 1 illustrates a block diagram of an example, non-limiting system 100 that provides an improved dilution refrigerator for a superconducting quantum processor in accordance with one or more embodiments described herein. For instance, the system 100 can provide a novel measurement scheme for superconducting qubits using low-frequency microwave signals within a dilution refrigerator in accordance with one or more embodiments described herein. In an embodiment, the system 100 can be a quantum computing system. In another embodiment, the system 100 can additionally or alternatively be a cryogenic microwave system. In various embodiments, the system 100 can be associated with technologies such as, but not limited to, quantum computing technologies, superconducting technologies, quantum hardware technologies, quantum computer technologies, quantum circuit technologies, quantum processor technologies, cryogenic microwave technologies, dilution refrigerator technologies, quantum amplifier technologies, superconducting qubit technologies, microwave device technologies, quantum information processing technologies, artificial intelligence technologies, machine learning technologies, and/or other technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized circuits, one or more specialized hardware, etc.) for carrying out defined processes and/or tasks related to a quantum computing and/or a dilution refrigerator system. The system 100 and/or components of the system can be employed to solve new problems that arise through advancements in technologies mentioned above, such as, for example, quantum computing technologies, superconducting technologies, quantum hardware technologies, quantum computer technologies, quantum circuit technologies, quantum processor technologies, dilution refrigerator technologies, cryogenic microwave technologies, quantum amplifier technologies, superconducting qubit technologies, microwave device technologies, quantum information processing technologies, artificial intelligence technologies, machine learning technologies, and the like. One or more embodiments of the system 100 can provide technical improvements to quantum computing systems, superconducting systems, quantum hardware systems, quantum computer systems, quantum circuit systems, quantum processor systems, dilution refrigerator systems, cryogenic microwave systems, quantum amplifier systems, superconducting qubit systems, microwave device systems, quantum information processing systems, artificial intelligence systems, machine learning systems and/or other technical systems. One or more embodiments of the system 100 can also provide technical improvements to a dilution refrigerator by reducing heat load within the dilution refrigerator can be reduced and/or reducing power consumption for the dilution refrigerator. Additionally or alternatively, one or more embodiments of the system 100 can also provide technical improvements to a quantum processor by improving performance of the quantum processor and/or improving accuracy of the quantum processor.

In the embodiment shown in FIG. 1, the system 100 can include a dilution refrigerator system 102, a quantum processor 104 and/or a classical computing system 106. The dilution refrigerator system 102 can be a dilution refrigerator employed to cool the quantum processor 104. For example, the dilution refrigerator system 102 can be a dilution refrigerator employed to cool the quantum processor 104 to millikelvin temperatures. In an embodiment, the dilution refrigerator system 102 can house the quantum processor 104. In another embodiment, the quantum processor 104 can be mounted to the dilution refrigerator system 102. In an example, the quantum processor 104 can be mounted to a base stage of the dilution refrigerator system 102. The base stage can be, for example, a coldest portion of the dilution refrigerator system 102). The quantum processor 104 can be a device (e.g., a quantum computer, a quantum circuit, etc.) configured to manipulate quantum states for quantum computing. In one example, the quantum processor 104 can be a superconducting quantum processor. In an aspect, the quantum processor 104 can be a machine that performs a set of calculations based on principle of quantum physics. For example, the quantum processor 104 can encode and/or process information using qubits. In one embodiment, the quantum processor 104 can be a hardware quantum processor (e.g., a hardware superconducting quantum processor) that can encode and/or process information using qubits. For example, the quantum processor 104 can be a hardware quantum processor that executes a set of instruction threads associated with qubits. In a non-limiting embodiment, the quantum processor 104 can be a qubit-resonator. The classical computing system 106 can perform classical computing that stores and/or processes information using bits (e.g., a "0" valued bit and a "1" valued bit). In an aspect, the classical computing system 106 can be implemented at approximately room-temperature (e.g., approximately 273 K). The classical computing system 106 can perform classical signal processing and/or signal analysis. The classical computing system 106 can additionally or alternatively manage storage of data (e.g., bits). Furthermore, the classical computing system 106 can include one or more electronics operated at approximately room-temperature.

In an embodiment, the classical computing system 106 can provide a microwave signal 108 to the dilution refrigerator system 102. The microwave signal 108 can be a radio frequency signal associated with an oscillatory change in voltage and/or current. Furthermore, the microwave signal 108 can include one or more microwave signals. The microwave signal 108 can be employed to control the quantum processor 104. Additionally or alternatively, the microwave signal 108 can be employed to measure quantum information associated with the quantum processor 104. In an aspect, the microwave signal 108 can be a high-frequency microwave signal in a frequency range, for example, between 4 GHz and 10 GHz. In an embodiment, the microwave signal 108 can be a qubit readout signal. For example, the microwave signal 108 can carry qubit information such as, for example, qubit readout information.

The dilution refrigerator system 102 can modify the microwave signal 108 to generate a modified-frequency microwave signal 109 for transmission within the dilution refrigerator system 102. For example, the modified-frequency microwave signal 109 can be a modified version of the microwave signal 108 with a reduced frequency. In another example, the modified-frequency microwave signal 109 can be a modified version of the microwave signal 108 with an increased frequency. In an embodiment, the modified-frequency microwave signal 109 can be a low-frequency microwave signal in a frequency range, for example, between 0.5 GHz and 2 GHz. For example, the modified-frequency microwave signal 109 can comprise a frequency below a qubit frequency associated with the quantum processor 104. Additionally or alternatively, the modified-frequency microwave signal 109 can comprise a frequency below a readout resonator frequency associated with the quantum processor 104. In an embodiment, the dilution refrigerator system 102 can perform a downconversion process associated with the microwave signal 108 to generate the modified-frequency microwave signal 109. The downconversion process performed by the dilution refrigerator system 102 can be lossless and coherent. Furthermore, in certain embodiments, the dilution refrigerator system 102 can employ a set of Josephson mixers to downconvert the microwave signal 108 and generate the modified-frequency microwave signal 109. The set of Josephson mixers can be, for example, dissipation-less three-wave Josephson mixers. In an implementation, the set of Josephson mixers can be employed for upconversion in an embodiment where the microwave signal 108 is a low-frequency signal. For example, in an embodiment, the microwave signal 108 can be synthesized using one or more electronics (e.g., one or more electronics at room-temperature) within the classical computing system 106. In an alternate embodiment, one or more RSFQ circuits (e.g., one or more electronics at a 4 K stage) within the dilution refrigerator system 102 can synthesize the microwave signal 108 as a low-frequency signal. In another embodiment, the microwave signal 108 can be synthesized as a high-frequency signal using one or more electronics (e.g., one or more electronics at room-temperature) within the classical computing system 106. Alternatively, one or more RSFQ circuits (e.g., one or more electronics at a 4 K stage) within the dilution refrigerator system 102 can synthesize the microwave signal 108 as a high-frequency signal. In yet another embodiment, the dilution refrigerator system 102 can decrease and increase a frequency of the microwave signal 108 to provide the modified-frequency microwave signal 109. For example, the dilution refrigerator system 102 can decrease a frequency of the microwave signal 108 to generate a decreased-frequency version of the microwave signal 108. The dilution refrigerator system 102 can also increase a frequency of the decreased-frequency version of the microwave signal 108 to a particular frequency below an original frequency of the microwave signal 108. In certain embodiments, a frequency of the microwave signal 108 can be upconverted to a readout frequency of a readout resonator associated with the quantum processor 104. In an aspect, the modified-frequency microwave signal 109 can be employed to provide a qubit measurement (e.g., a qubit measurement associated with the quantum processor 104) to the classical computing system 106. In another embodiment, the dilution refrigerator system 102 can convert the reduced-frequency microwave signal 11 into a digital signal 112. The digital signal 112 can include the qubit measurement associated with the quantum processor 104. For example, the digital signal 112 can encode the qubit measurement associated with the quantum processor 104 as a sequence of binary values. Furthermore, the dilution refrigerator system 102 can provide the digital signal 112 to the classical computing system 106. As such, the classical computing system 106 can perform classical signal processing of the digital signal 112 to obtain the qubit measurement associated with the quantum processor 104.

It is to be appreciated that the system 100 can provide various advantages as compared to conventional dilution refrigerator systems. For instance, by employing the system 100, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 100, performance and/or accuracy of a quantum processor associated with a dilution refrigerator system can be improved. In an example, employing the modified-frequency microwave signal 109 (e.g., a reduced-frequency microwave signal) can improve performance and/or accuracy of the quantum processor 104. In another example, the dilution refrigerator system 102 can decrease and increase frequency of the microwave signal 108 inside the dilution refrigerator system 102 to improve coherence of the quantum processor 104 and/or to reduce hardware overhead for the quantum processor 104.

Figure 2:
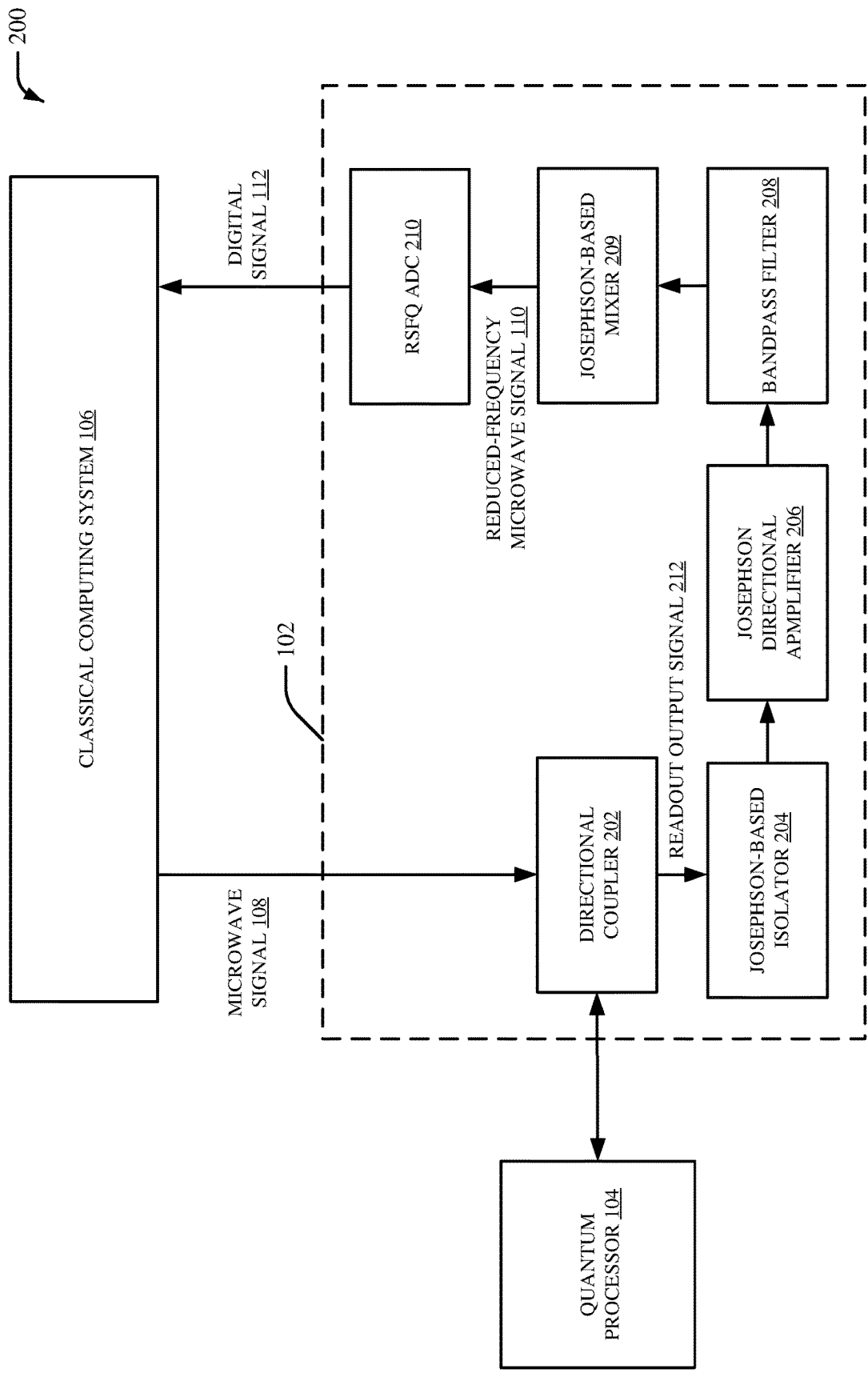
FIG. 2 illustrates another example, non-limiting system associated with a dilution refrigerator system, a quantum processor and a classical computing system in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 can include the dilution refrigerator system 102, the quantum processor 104 and/or the classical computing system 106. In an embodiment shown in FIG. 2, the dilution refrigerator system 102 can include a directional coupler 202, a Josephson-based isolator 204, a Josephson directional amplifier 206, a bandpass filter 208, a Josephson-based mixer 209 and/or a rapid single flux quantum (RSFQ) analog-to-digital converter (ADC) 210. In an embodiment, the directional coupler 202, the Josephson-based isolator 204, the Josephson directional amplifier 206, the bandpass filter 208, and/or the Josephson-based mixer 209 can be mounted on a 10 mK stage of the dilution refrigerator system 102. Additionally or alternatively, the RSFQ ADC 210 can be mounted on a 4 K stage of the dilution refrigerator system 102. The microwave signal 108 generated by the classical computing system 106 can be provided to the dilution refrigerator system 102 via an input transmission line for the dilution refrigerator system 102. In certain embodiments, the input transmission line for the dilution refrigerator system 102 can include one or more attenuators and/or one or more filters (e.g., one or more lowpass filters) to attenuate and/or filter the microwave signal 108. In an embodiment, the microwave signal 108 can comprise a frequency that corresponds to a qubit resonant frequency and/or a readout resonant frequency associated with the quantum processor 104. For example, the microwave signal 108 can comprise a frequency that corresponds to a qubit resonant frequency of a superconducting qubit of the quantum processor 104. Additionally or alternatively, the microwave signal 108 can comprise a frequency that corresponds to a readout resonator of the quantum processor 104. In certain embodiments, the microwave signal 108 can additionally or alternatively control one or more portions of the quantum processor 104. For example, the microwave signal 108 can control one or more portions of the quantum processor 104 can control a superconducting qubit of the quantum processor 104. Additionally or alternatively, the microwave signal 108 can facilitate one or more quantum measurements associated with the quantum processor 104. For example, the microwave signal 108 can facilitate measurement of qubit information associated with the quantum processor 104. In one example, the qubit information can include information regarding a qubit state (e.g., an excited state, a ground state, or a superposition state) of a superconducting qubit of the quantum processor 104.

The microwave signal 108 can be received by the directional coupler 202 of the dilution refrigerator system 102. The directional coupler 202 can be a circuit that facilitates a connection between the classical computing system 106, the quantum processor 104, and/or the Josephson-based isolator 204. In an aspect, the microwave signal 108 can be received by a first port of the directional coupler 202. A portion of the microwave signal 108 can dissipated via a cold load coupled to the directional coupler 202 via a second port of the directional coupler 202. The cold load can be, for example, a 50 Ohm load. Furthermore, a remaining portion of the microwave signal 108 can be provided to the quantum processor 104 via a third port of the directional coupler 202. For instance, the remaining portion of the microwave signal 108 can be provided to the quantum processor 104 via the third port. Furthermore, the remaining portion of the microwave signal 108 can be reflected off the quantum processor 104 (e.g., off a qubit resonator of the quantum processor 104) to provide a readout output signal 212 associated with qubit information (e.g., a qubit measurement) associated with the quantum processor 104. In an embodiment, the microwave signal 108 can be reflected off the quantum processor 104 via circuit quantum electrodynamics (cQED). For example, a superconducting qubit of the quantum processor 104 can be dispersively coupled to a qubit resonator of the quantum processor 104. Furthermore, a qubit state can be determined based on a measured phase shift of the microwave signal 108 applied to the quantum processor 104. As such, the readout output signal 212 provided by the quantum processor 104 can include qubit information such as a qubit measurement, a qubit state, and/or other qubit information.

The Josephson-based isolator 204, the Josephson directional amplifier 206, and/or the bandpass filter 208 can further process the readout output signal 212 provided by the quantum processor 104 (e.g., the readout output signal 212 associated with the microwave signal 108). In an aspect, the readout output signal 212 can be transmitted to the Josephson-based isolator 204 via a fourth port of the directional coupler 202. The Josephson-based isolator 204 can allow the readout output signal 212 to be transmitted within the dilution refrigerator system 102 without attenuation. The Josephson-based isolator 204 can also allow the readout output signal 212 to be transmitted in a single direction towards the Josephson directional amplifier 206. In an embodiment, the Josephson-based isolator 204 can include two active Josephson mixers coupled via beam-splitters. The two active Josephson mixers of the Josephson-based isolator 204 can be driven, for example, via a microwave pump source signal. In another embodiment, the Josephson-based isolator 204 can limit noise provided to the quantum processor 104 (e.g., noise coming from an output chain within the dilution refrigerator system 102). The Josephson directional amplifier 206 can amplify the readout output signal 212. The Josephson directional amplifier 206 can be a quantum-limited amplifier or a near quantum-limited amplifier. In an embodiment, the Josephson directional amplifier 206 can comprise two Josephson parametric converters coupled together to facilitate amplification of the readout output signal 212. In certain embodiments, the readout output signal 212 can additionally be filtered by the bandpass filter 208 centered around a particular frequency. For example, the bandpass filter 208 can allow a particular band of frequencies associated with the readout output signal 212 to pass through to the Josephson-based mixer 209. In an aspect, the bandpass filter 208 can transmit the readout output signal 212 with minimal loss and can block DC-signals and/or microwave signals below a threshold frequency. The Josephson-based mixer 209 can convert the readout output signal 212 into a reduced-frequency microwave signal 110. The reduced-frequency microwave signal 110 can comprise a frequency that is lower than a frequency of the readout output signal 212 and a frequency of the microwave signal 108. For example, the reduced-frequency microwave signal 110 can comprise a frequency that is lower than a frequency of the superconducting qubit of the quantum processor 104 and a frequency of the qubit resonator of the quantum processor 104. In an embodiment, the Josephson-based mixer 209 can include a set of Josephson ring modulators that are coupled to one or more lumped-element resonators and/or one or more surface acoustic wave resonators to facilitate downconversion of the readout output signal 212 associated with the microwave signal 108 into the reduced-frequency microwave signal 110. Accordingly, the reduced-frequency microwave signal 110 can be a downconverted readout output signal (e.g., a downconverted version of the readout output signal 212). In an embodiment, the reduced-frequency microwave signal 110 generated by the Josephson-based mixer 209 can be filtered by a lowpass filter. For example, an output line between a 10 mK stage of the dilution refrigerator system 102 and a 4 K stage of the dilution refrigerator system 102 can include a lowpass filter between the Josephson-based mixer 209 and the RSFQ ADC 210. The lowpass filter can reject high-frequency signals and/or noise above a cutoff frequency for the lowpass filter. For example, the lowpass filter can transmit the reduced-frequency microwave signal 110 with minimal loss for processing by the RSFQ ADC 210. Furthermore, the lowpass filter can reject high frequency noise associated with an output chain within the dilution refrigerator system 102. Furthermore, the RSFQ ADC 210 can generate the digital signal 112. For instance, the RSFQ ADC 210 can sample and/or digitize the reduced-frequency microwave signal 110 to generate the digital signal 112. In an embodiment, the RSFQ ADC 210 can digitize the reduced-frequency microwave signal 110 based on a superconducting device to generate the digital signal 112. As such, the digital signal 112 can include an encoded version of the qubit information included in the readout output signal 212, where the qubit information included in the digital signal 112 is encoded using a sequence of binary bits. In an embodiment, the RSFQ ADC 210 can employ single flux quantum voltage pulses generated by Josephson junctions to convert the reduced-frequency microwave signal 110 into the digital signal 112. The digital signal 112 generated by the RSFQ ADC 210 can be provided to the classical computing system 106 via an output transmission line for the dilution refrigerator system 102. In certain embodiments, the RSFQ ADC 210 can be an energy-efficient RSFQ (ERSFQ) ADC or an energy-efficient single flux quantum (eSFQ) ADC. In certain embodiments, the RSFQ ADC 210 and/or the lowpass filter that filters the reduced-frequency microwave signal 110 can be located on an output transmission line for the dilution refrigerator system 102.

It is to be appreciated that the system 200 can provide various advantages as compared to conventional dilution refrigerator systems. For instance, by employing the system 200, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 200, performance and/or accuracy of a quantum processor associated with a dilution refrigerator system can be improved.

Figure 3:
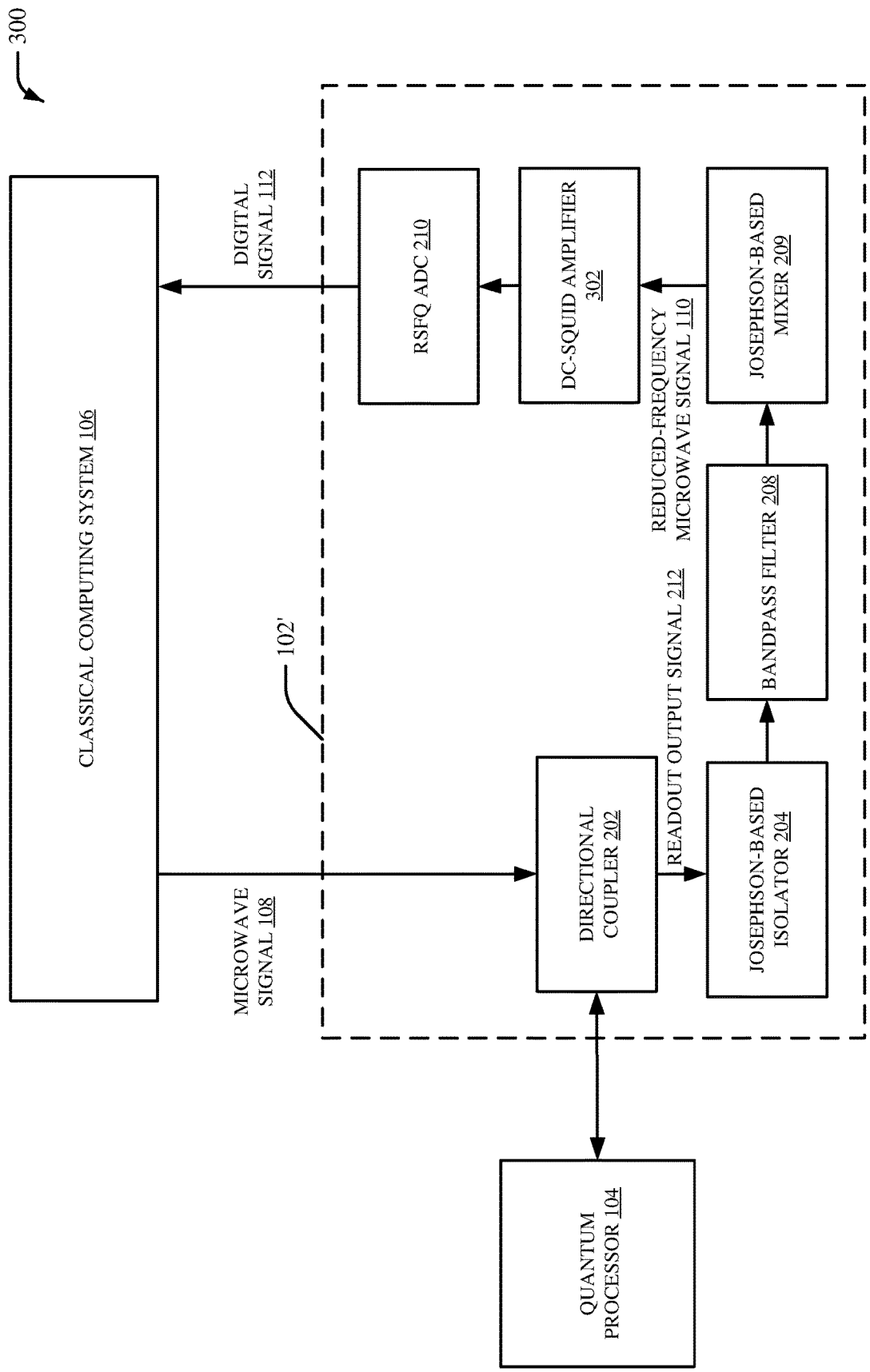
FIG. 3 illustrates yet another example, non-limiting system associated with a dilution refrigerator system, a quantum processor and a classical computing system in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 can include a dilution refrigerator system 102', the quantum processor 104 and/or the classical computing system 106. The dilution refrigerator system 102' can be an alternate embodiment of the dilution refrigerator system 102. In an embodiment shown in FIG. 3, the dilution refrigerator system 102' can include the directional coupler 202, the Josephson-based isolator 204, the bandpass filter 208, the Josephson-based mixer 209, a direct current superconducting quantum interference device (DC-SQUID) amplifier 302 and/or the RSFQ ADC 210. In an embodiment, the directional coupler 202, the Josephson-based isolator 204, the bandpass filter 208, the Josephson-based mixer 209, and/or the DC-SQUID amplifier 302 can be mounted on a 10 mK stage of the dilution refrigerator system 102'. Additionally or alternatively, the RSFQ ADC 210 can be mounted on a 4 K stage of the dilution refrigerator system 102'. The microwave signal 108 generated by the classical computing system 106 can be provided to the dilution refrigerator system 102' via an input transmission line for the dilution refrigerator system 102'. In certain embodiments, the input transmission line for the dilution refrigerator system 102' can include one or more attenuators and/or one or more filters (e.g., one or more lowpass filters) to attenuate and/or filter the microwave signal 108. In an embodiment, the microwave signal 108 can comprise a frequency that corresponds to a qubit resonant frequency and/or a readout resonant frequency associated with the quantum processor 104. For example, the microwave signal 108 can comprise a frequency that corresponds to a qubit resonant frequency of a superconducting qubit of the quantum processor 104. Additionally or alternatively, the microwave signal 108 can comprise a frequency that corresponds to a readout resonator of the quantum processor 104. In certain embodiments, the microwave signal 108 can additionally or alternatively control one or more portions of the quantum processor 104. For example, the microwave signal 108 can control one or more portions of the quantum processor 104 can control a superconducting qubit of the quantum processor 104. Additionally or alternatively, the microwave signal 108 can facilitate one or more quantum measurements associated with the quantum processor 104. For example, the microwave signal 108 can facilitate measurement of qubit information associated with the quantum processor 104. In one example, the qubit information can include information regarding a qubit state (e.g., an excited state, a ground state, or a superposition state) of a superconducting qubit of the quantum processor 104.

The microwave signal 108 can be received by the directional coupler 202 of the dilution refrigerator system 102'. The directional coupler 202 can be a circuit that facilitates a connection between the classical computing system 106, the quantum processor 104, and/or the Josephson-based isolator 204. In an aspect, the microwave signal 108 can be received by a first port of the directional coupler 202. A portion of the microwave signal 108 can be dissipated via a cold load coupled to the directional coupler 202 via a second port of the directional coupler 202. The cold load can be, for example, a 50 Ohm load. Furthermore, a remaining portion of the microwave signal 108 can be provided to the quantum processor 104 via a third port of the directional coupler 202. For instance, the remaining portion of the microwave signal 108 can be provided to the quantum processor 104 via the third port. Furthermore, the remaining portion of the microwave signal 108 can be reflected off the quantum processor 104 (e.g., off a qubit resonator of the quantum processor 104) to provide a readout output signal 212 associated with qubit information (e.g., a qubit measurement) associated with the quantum processor 104. In an embodiment, the microwave signal 108 can be reflected off the quantum processor 104 via cQED. For example, a superconducting qubit of the quantum processor 104 can be dispersively coupled to a qubit resonator of the quantum processor 104. Furthermore, a qubit state can be determined based on a measured phase shift of the microwave signal 108 applied to the quantum processor 104. As such, the readout output signal 212 provided by the quantum processor 104 can include qubit information such as a qubit measurement, a qubit state, and/or other qubit information.

The Josephson-based isolator 204 and/or the bandpass filter 208 can further process the readout output signal 212 provided by the quantum processor 104 (e.g., the readout output signal 212 associated with the microwave signal 108). In an aspect, the readout output signal 212 can be transmitted to the Josephson-based isolator 204 via a fourth port of the directional coupler 202. The Josephson-based isolator 204 can allow the readout output signal 212 to be transmitted within the dilution refrigerator system 102' without attenuation. The Josephson-based isolator 204 can also allow the readout output signal 212 to be transmitted in a single direction towards the bandpass filter 208. In an embodiment, the Josephson-based isolator 204 can include two active Josephson mixers coupled via beam-splitters. The two active Josephson mixers of the Josephson-based isolator 204 can be driven, for example, via a microwave pump source signal. In certain embodiments, the readout output signal 212 can additionally be filtered by the bandpass filter 208 centered around a particular frequency. For example, the bandpass filter 208 can allow a particular band of frequencies associated with the readout output signal 212 to pass through to the Josephson-based mixer 209. In an aspect, the bandpass filter 208 can transmit the readout output signal 212 with minimal loss and can block DC-signals and/or microwave signals below a threshold frequency. The Josephson-based mixer 209 can convert the readout output signal 212 into the reduced-frequency microwave signal 110. The reduced-frequency microwave signal 110 can comprise a frequency that is lower than a frequency of the readout output signal 212 and a frequency of the microwave signal 108. For example, the reduced-frequency microwave signal 110 can comprise a frequency that is lower than a frequency of the superconducting qubit of the quantum processor 104 and a frequency of the qubit resonator of the quantum processor 104. In an embodiment, the Josephson-based mixer 209 can include a set of Josephson ring modulators that are coupled to one or more lumped-element resonators and/or one or more surface acoustic wave resonators to facilitate downconversion of the readout output signal 212 associated with the microwave signal 108 into the reduced-frequency microwave signal 110. Accordingly, the reduced-frequency microwave signal 110 can be a downconverted readout output signal (e.g., a downconverted version of the readout output signal 212). The DC-SQUID amplifier 302 can amplify the reduced-frequency microwave signal 110. The DC-SQUID amplifier 302 can be a quantum-limited amplifier or a near quantum-limited amplifier. In an embodiment, the DC-SQUID amplifier 302 can comprise two Josephson junctions in parallel in a superconducting loop coupled to a microwave circuitry on chip to facilitate amplification of the reduced-frequency microwave signal 110. In an embodiment, an amplified version of the reduced-frequency microwave signal 110 generated by the DC-SQUID amplifier 302 can be filtered by a lowpass filter. For example, an output line between a 10 mK stage of the dilution refrigerator system 102 and a 4 K stage of the dilution refrigerator system 102 can include a lowpass filter between the DC-SQUID amplifier 302 and the RSFQ ADC 210. The lowpass filter can reject high-frequency signals and/or noise above a cutoff frequency for the lowpass filter. Furthermore, the RSFQ ADC 210 can generate the digital signal 112 based on the amplified version of the reduced-frequency microwave signal 110. For instance, the RSFQ ADC 210 can sample and/or digitize the amplified version of the reduced-frequency microwave signal 110 to generate the digital signal 112. As such, the digital signal 112 can include an encoded version of the qubit information included in the readout output signal 212, where the qubit information included in the digital signal 112 is encoded using a sequence of binary bits. In an embodiment, the RSFQ ADC 210 can employ single flux quantum voltage pulses generated by Josephson junctions to convert the amplified version of the reduced-frequency microwave signal 110 into the digital signal 112. The digital signal 112 generated by the RSFQ ADC 210 can be provided to the classical computing system 106 via an output transmission line for the dilution refrigerator system 102'. In certain embodiments, the RSFQ ADC 210 can be an ERSFQ ADC or an eSFQ ADC. In certain embodiments, the RSFQ ADC 210 and/or the lowpass filter that filters the reduced-frequency microwave signal 110 can be located on an output transmission line for the dilution refrigerator system 102'.

It is to be appreciated that the system 300 can provide various advantages as compared to conventional dilution refrigerator systems. For instance, by employing the system 300, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 300, performance and/or accuracy of a quantum processor associated with a dilution refrigerator system can be improved.

Figure 4:
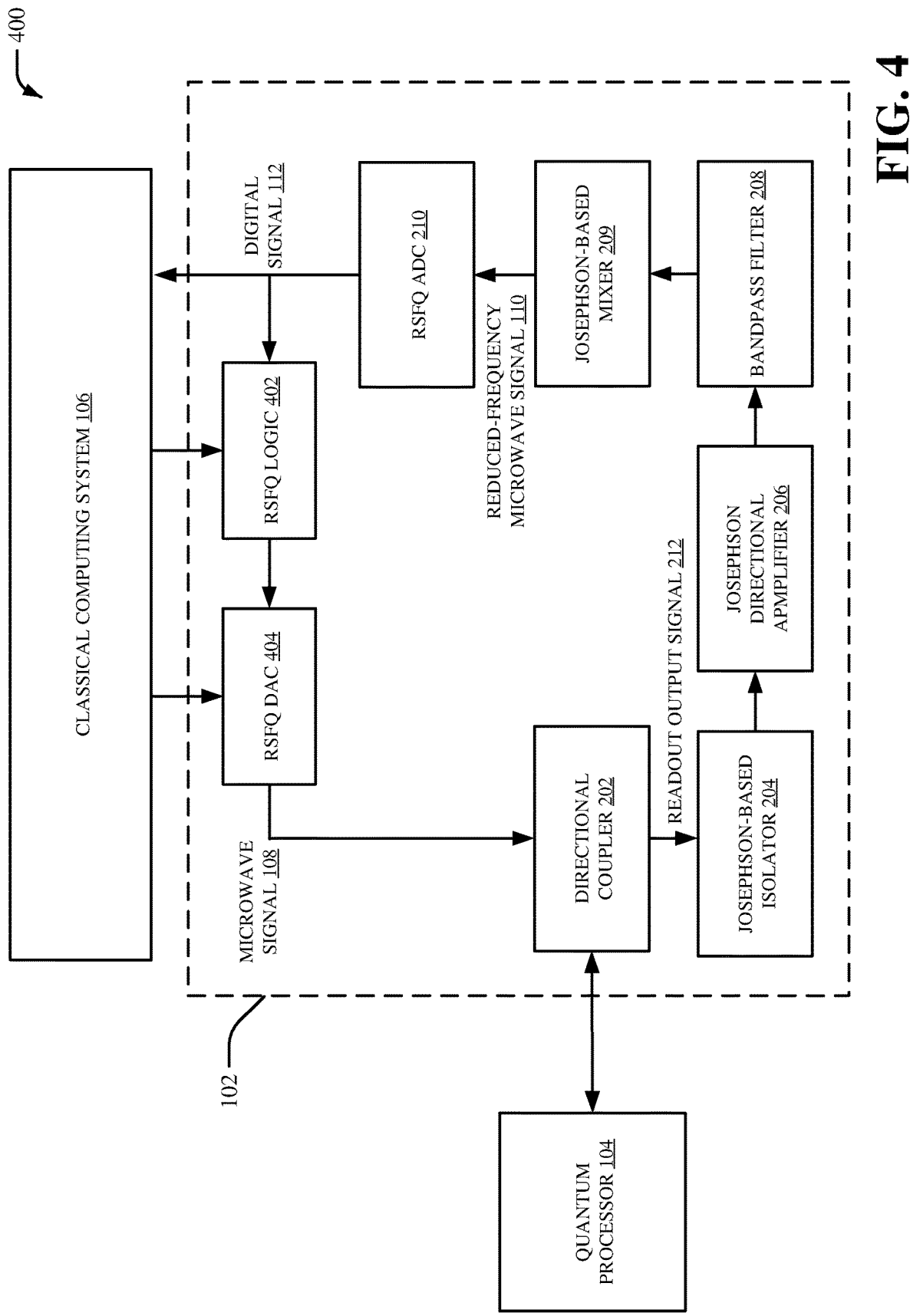
FIG. 4 illustrates yet another example, non-limiting system associated with a dilution refrigerator system, a quantum processor and a classical computing system in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 can include the dilution refrigerator system 102, the quantum processor 104, the classical computing system 106, RSFQ logic 402 and/or an RSFQ digital-to-analog converter (DAC) 404. The dilution refrigerator system 102 can include the directional coupler 202, the Josephson-based isolator 204, the Josephson directional amplifier 206, the bandpass filter 208, the Josephson-based mixer 209 and/or the RSFQ ADC 210. In an embodiment shown in FIG. 4, the RSFQ DAC 404 can generate the microwave signal 108. The microwave signal 108 generated by the RSFQ DAC 404 can be provided to the dilution refrigerator system 102 via an input transmission line for the dilution refrigerator system 102. In certain embodiments, the input transmission line for the dilution refrigerator system 102 can include one or more attenuators and/or one or more filters (e.g., one or more lowpass filters) to attenuate and/or filter the microwave signal 108. The RSFQ DAC 404 and/or the RSFQ DAC 404 can be communicatively coupled to the classical computing system 106. For example, the RSFQ DAC 404 and/or the RSFQ DAC 404 can be communicatively coupled to one or more electronics of the classical computing system 106. In an embodiment, the RSFQ DAC 404 and/or the RSFQ DAC 404 can be located in a 4 K stage of the dilution refrigerator system 102. The digital signal 112 can be provided to the classical computing system 106 and the RSFQ Logic 402. The RSFQ logic 402 can include logic to facilitate converting the digital signal 112 into the microwave signal 108. For example, the RSFQ logic 402 can include logic to facilitate converting the digital signal 112 into a feedback version or a sequential version of the microwave signal 108. In certain embodiments, the RSFQ logic 402 can include logic to facilitate converting the digital signal 112 into a feedback version or a sequential version of the microwave signal 108 based on a result of the digital signal 112. As such, in certain embodiments, the microwave signal 108 can be generated by a device inside the dilution refrigerator system 102.

It is to be appreciated that the system 400 can provide various advantages as compared to conventional dilution refrigerator systems. For instance, by employing the system 400, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 400, performance and/or accuracy of a quantum processor associated with a dilution refrigerator system can be improved.

Figure 5:
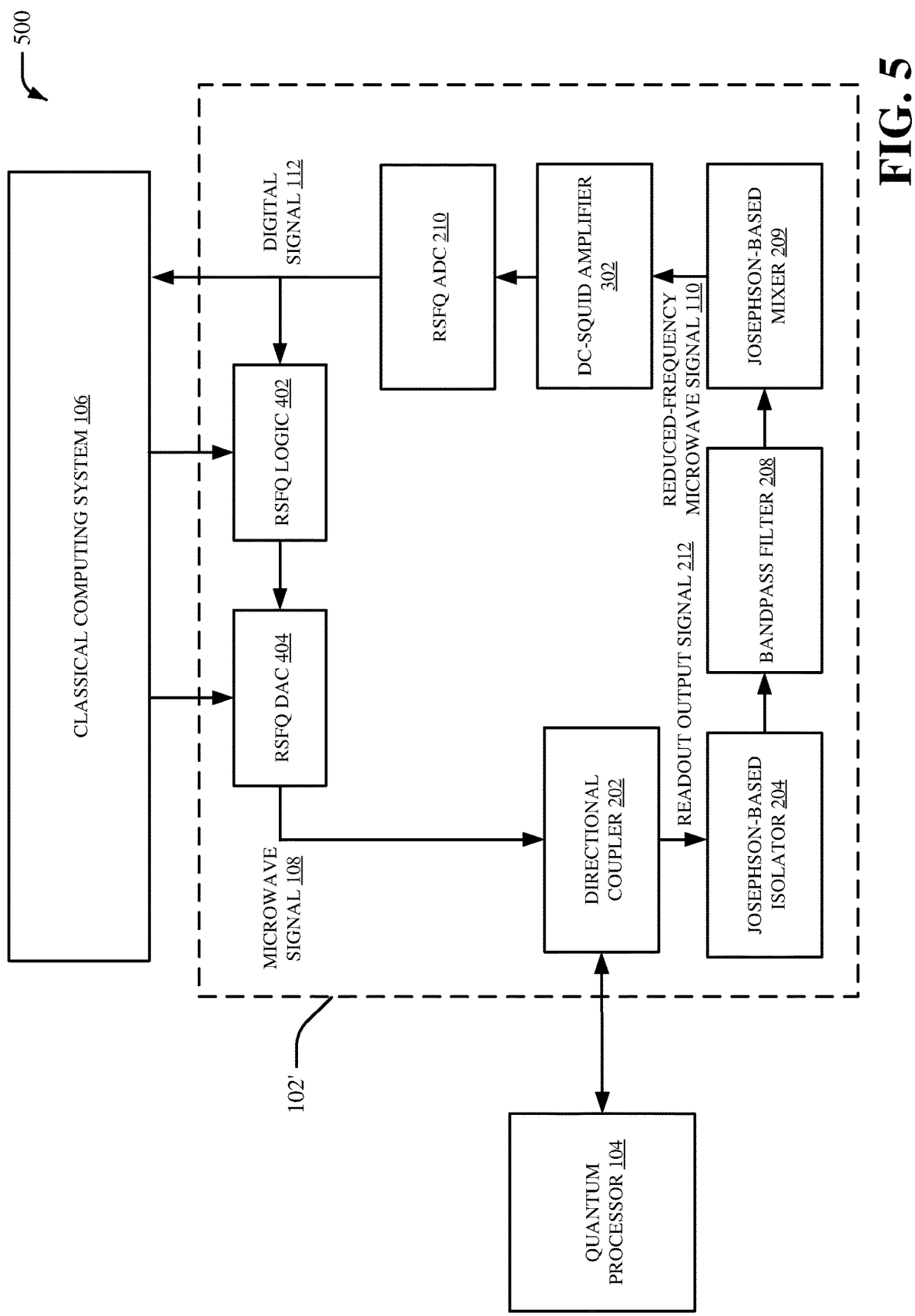
FIG. 5 illustrates yet another example, non-limiting system associated with a dilution refrigerator system, a quantum processor and a classical computing system in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 can include the dilution refrigerator system 102', the quantum processor 104, the classical computing system 106, the RSFQ logic 402 and/or the RSFQ DAC 404. The dilution refrigerator system 102' can include the directional coupler 202, the Josephson-based isolator 204, the bandpass filter 208, the Josephson-based mixer 209, the DC-SQUID amplifier 302 and/or the RSFQ ADC 210. In an embodiment shown in FIG. 5, the RSFQ DAC 404 can generate the microwave signal 108. The microwave signal 108 generated by the RSFQ DAC 404 can be provided to the dilution refrigerator system 102' via an input transmission line for the dilution refrigerator system 102. In certain embodiments, the input transmission line for the dilution refrigerator system 102' can include one or more attenuators and/or one or more filters (e.g., one or more lowpass filters) to attenuate and/or filter the microwave signal 108. The RSFQ DAC 404 and/or the RSFQ DAC 404 can be communicatively coupled to the classical computing system 106. For example, the RSFQ DAC 404 and/or the RSFQ DAC 404 can be communicatively coupled to one or more electronics of the classical computing system 106. In an embodiment, the RSFQ DAC 404 and/or the RSFQ DAC 404 can be located in a 4 K stage of the dilution refrigerator system 102'. The digital signal 112 can be provided to the classical computing system 106 and the RSFQ Logic 402. The RSFQ logic 402 can include logic to facilitate converting the digital signal 112 into the microwave signal 108. For example, the RSFQ logic 402 can include logic to facilitate converting the digital signal 112 into a feedback version or a sequential version of the microwave signal 108. In certain embodiments, the RSFQ logic 402 can include logic to facilitate converting the digital signal 112 into a feedback version or a sequential version of the microwave signal 108 based on a result of the digital signal 112. As such, in certain embodiments, the microwave signal 108 can be generated by a device inside the dilution refrigerator system 102'.

It is to be appreciated that the system 500 can provide various advantages as compared to conventional dilution refrigerator systems. For instance, by employing the system 500, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 500, performance and/or accuracy of a quantum processor associated with a dilution refrigerator system can be improved.

Figure 6:
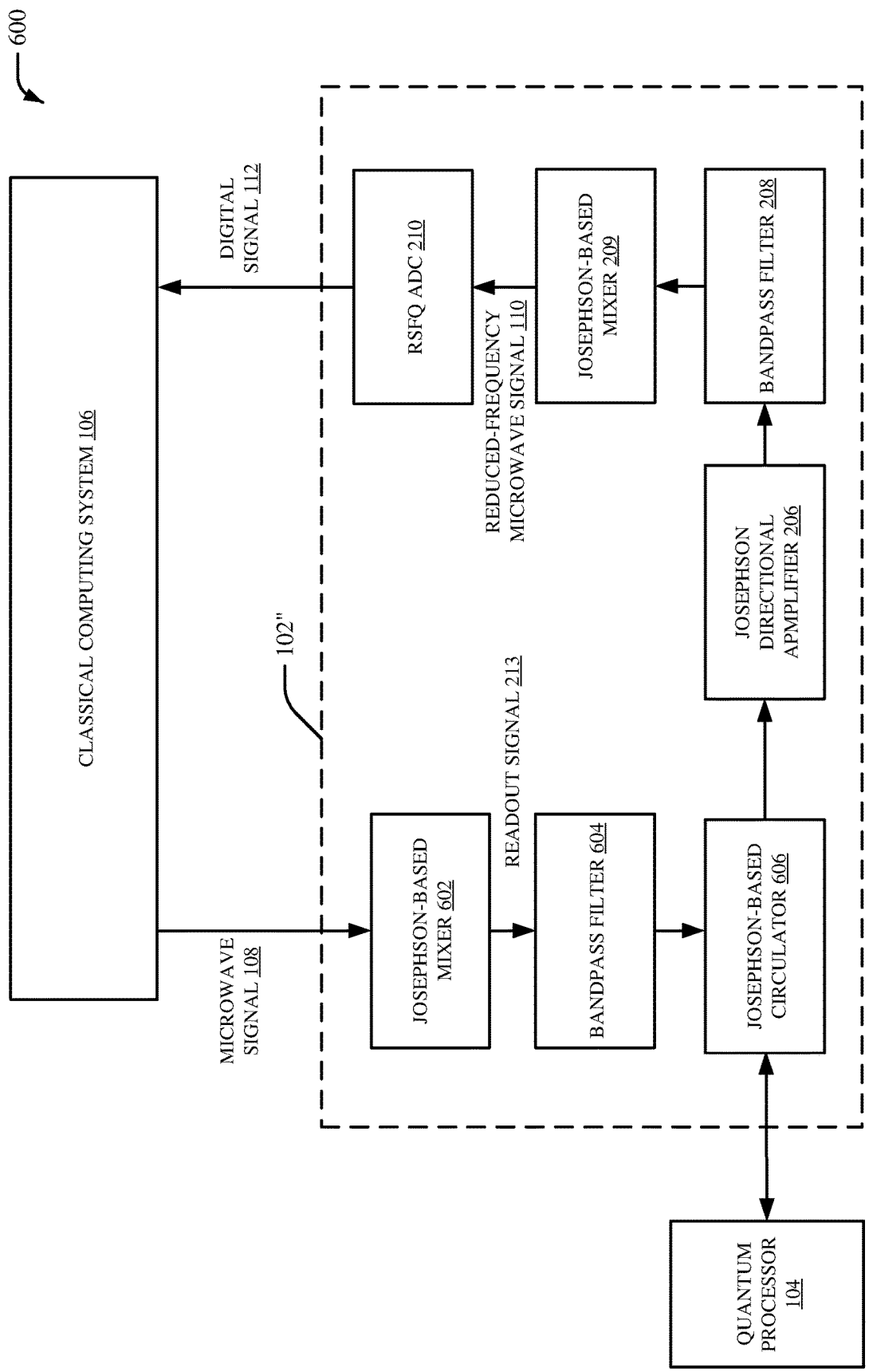
FIG. 6 illustrates yet another example, non-limiting system associated with a dilution refrigerator system, a quantum processor and a classical computing system in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 can include a dilution refrigerator system 102", the quantum processor 104 and/or the classical computing system 106. The dilution refrigerator system 102" can be an alternate embodiment of the dilution refrigerator system 102. In an embodiment shown in FIG. 6, the dilution refrigerator system 102" can include a Josephson-based mixer 602, a bandpass filter 604, a Josephson-based circulator 606, the Josephson directional amplifier 206, the bandpass filter 208, the Josephson-based mixer 209 and/or the RSFQ ADC 210. In an embodiment, the Josephson-based mixer 602, the bandpass filter 604, the Josephson-based circulator 606, the Josephson directional amplifier 206, the bandpass filter 208, and/or the Josephson-based mixer 209 can be mounted on a 10 mK stage of the dilution refrigerator system 102". Additionally or alternatively, the RSFQ ADC 210 can be mounted on a 4 K stage of the dilution refrigerator system 102". The microwave signal 108 generated by the classical computing system 106 can be provided to the dilution refrigerator system 102" via an input transmission line for the dilution refrigerator system 102". In certain embodiments, the input transmission line for the dilution refrigerator system 102" can include one or more attenuators and/or one or more filters (e.g., one or more lowpass filters) to attenuate and/or filter the microwave signal 108. In an embodiment, the microwave signal 108 can comprise a low frequency that is below a qubit resonant frequency and/or a readout resonant frequency associated with the quantum processor 104. For example, the microwave signal 108 can comprise a frequency that is below a qubit resonant frequency of a superconducting qubit of the quantum processor 104. Additionally or alternatively, the microwave signal 108 can comprise a frequency that is below a readout resonator of the quantum processor 104. In certain embodiments, the microwave signal 108 can additionally or alternatively control one or more portions of the quantum processor 104. For example, the microwave signal 108 can control one or more portions of the quantum processor 104 can control a superconducting qubit of the quantum processor 104. Additionally or alternatively, the microwave signal 108 can facilitate one or more quantum measurements associated with the quantum processor 104. For example, the microwave signal 108 can facilitate measurement of qubit information associated with the quantum processor 104. In one example, the qubit information can include information regarding a qubit state (e.g., an excited state, a ground state, or a superposition state) of a superconducting qubit of the quantum processor 104. The microwave signal 108 can be received by the Josephson-based mixer 602 of the dilution refrigerator system 102". The Josephson-based mixer 602 can facilitate transmission and/or generation of the microwave signal 108 based on a pump signal with a particular frequency. In an aspect, the Josephson-based mixer 602 can upconvert the microwave signal 108 into an increased-frequency microwave signal. For instance, the Josephson-based mixer 602 can upconvert the microwave signal 108 into a readout signal 213. In an embodiment, the Josephson-based mixer 602 can include a set of Josephson ring modulators that are coupled to one or more lumped-element resonators and/or one or more surface acoustic wave resonators to facilitate upconversion of the microwave signal 108 into the increased-frequency microwave signal. Accordingly, the readout signal 213 can be an upconverted readout output signal. In certain embodiments, the microwave signal 108 can additionally be filtered by the bandpass filter 604 centered around a particular frequency. For example, the bandpass filter 604 can allow a particular band of frequencies associated with the microwave signal 108 to pass through to the Josephson-based circulator 606. In an aspect, the bandpass filter 604 can transmit the microwave signal 108 with minimal loss and can block DC-signals and/or microwave signals below a threshold frequency.

The Josephson-based circulator 606 can be a circuit that facilitates a connection between the classical computing system 106, the quantum processor 104, and/or the Josephson directional amplifier 206. In an aspect, the Josephson-based circulator 606 can be a nonreciprocal microwave device. The Josephson-based circulator 606 can include three ports, in an implementation. In another implementation, the Josephson-based circulator 606 can include four ports. In an example, a signal that enters a port of the Josephson-based circulator 606 can be routed with low loss to another port of the Josephson-based circulator 606 based on a predefined circulation direction. In an implementation, the microwave signal 108 can be received by a first port of the Josephson-based circulator 606. Furthermore, the quantum processor 104 can be coupled to a second port of the Josephson-based circulator 606. A portion of the microwave signal 108 can be reflected off the quantum processor 104 (e.g., off a qubit resonator of the quantum processor 104) via the second port to provide a readout output signal associated with qubit information (e.g., a qubit measurement) associated with the quantum processor 104. The readout output signal can be transmitted via a third port of the Josephson-based circulator 606. In certain embodiments, a cold load can be coupled to the Josephson-based circulator 606 via a fourth port of the Josephson-based circulator 606. The cold load can be, for example, a 50 Ohm load. In an embodiment, the microwave signal 108 can be reflected off the quantum processor 104 via cQED. For example, a superconducting qubit of the quantum processor 104 can be dispersively coupled to a qubit resonator of the quantum processor 104. Furthermore, a qubit state can be determined based on a measured phase shift of the microwave signal 108 applied to the quantum processor 104. As such, the readout output signal provided by the quantum processor 104 can include qubit information such as a qubit measurement, a qubit state, and/or other qubit information. In an aspect, the Josephson-based circulator 606 can block excess backaction of the Josephson directional amplifier 206 on the qubit information associated with the readout output signal. In an embodiment, the Josephson-based circulator 606 can be implemented without magnetic materials and/or strong magnetic fields. In another embodiment, the Josephson-based circulator 606 can include a set of Josephson parametric converters.

The Josephson directional amplifier 206 and/or the bandpass filter 208 can further process the readout output signal provided by the quantum processor 104 (e.g., the readout output signal associated with the microwave signal 108). In an aspect, the readout output signal can be transmitted to the Josephson directional amplifier 206. The Josephson directional amplifier 206 can amplify the readout output signal. The Josephson directional amplifier 206 can be a quantum-limited amplifier or a near quantum-limited amplifier. In an embodiment, the Josephson directional amplifier 206 can comprise two Josephson parametric converters coupled together to facilitate amplification of the readout output signal. In certain embodiments, the readout output signal can additionally be filtered by the bandpass filter 208 centered around a particular frequency. For example, the bandpass filter 208 can allow a particular band of frequencies associated with the readout output signal to pass through to the Josephson-based mixer 209. In an aspect, the bandpass filter 208 can transmit the readout output signal with minimal loss and can block DC-signals and/or microwave signals below a threshold frequency. The Josephson-based mixer 209 can convert the readout output signal into the reduced-frequency microwave signal 110. The reduced-frequency microwave signal 110 can comprise a frequency that is lower than a frequency of the readout output signal and a frequency of the microwave signal 108. For example, the reduced-frequency microwave signal 110 can comprise a frequency that is lower than a frequency of the superconducting qubit of the quantum processor 104 and a frequency of the qubit resonator of the quantum processor 104. In an embodiment, the Josephson-based mixer 209 can include a set of Josephson ring modulators that are coupled to one or more lumped-element resonators and/or one or more surface acoustic wave resonators to facilitate downconversion of the readout output signal associated with the microwave signal 108 into the reduced-frequency microwave signal 110. Accordingly, the reduced-frequency microwave signal 110 can be a downconverted readout output signal (e.g., a downconverted version of the readout output signal). In an embodiment, the reduced-frequency microwave signal 110 generated by the Josephson-based mixer 209 can be filtered by a lowpass filter. For example, an output line between a 10 mK stage of the dilution refrigerator system 102 and a 4 K stage of the dilution refrigerator system 102 can include a lowpass filter between the Josephson-based mixer 209 and the RSFQ ADC 210. The lowpass filter can reject high-frequency signals and/or noise above a cutoff frequency for the lowpass filter. Furthermore, the RSFQ ADC 210 can generate the digital signal 112. For instance, the RSFQ ADC 210 can sample and/or digitize the reduced-frequency microwave signal 110 to generate the digital signal 112. As such, the digital signal 112 can include an encoded version of the qubit information included in the readout output signal, where the qubit information included in the digital signal 112 is encoded using a sequence of binary bits. In an embodiment, the RSFQ ADC 210 can employ single flux quantum voltage pulses generated by Josephson junctions to convert the reduced-frequency microwave signal 110 into the digital signal 112. The digital signal 112 generated by the RSFQ ADC 210 can be provided to the classical computing system 106 via an output transmission line for the dilution refrigerator system 102". In certain embodiments, the RSFQ ADC 210 can be an ERSFQ ADC or an eSFQ ADC. In certain embodiments, the RSFQ ADC 210 and/or the lowpass filter that filters the reduced-frequency microwave signal 110 can be located on an output transmission line for the dilution refrigerator system 102".

It is to be appreciated that the system 600 can provide various advantages as compared to conventional dilution refrigerator systems. For instance, by employing the system 600, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 600, performance and/or accuracy of a quantum processor associated with a dilution refrigerator system can be improved.

Figure 7:
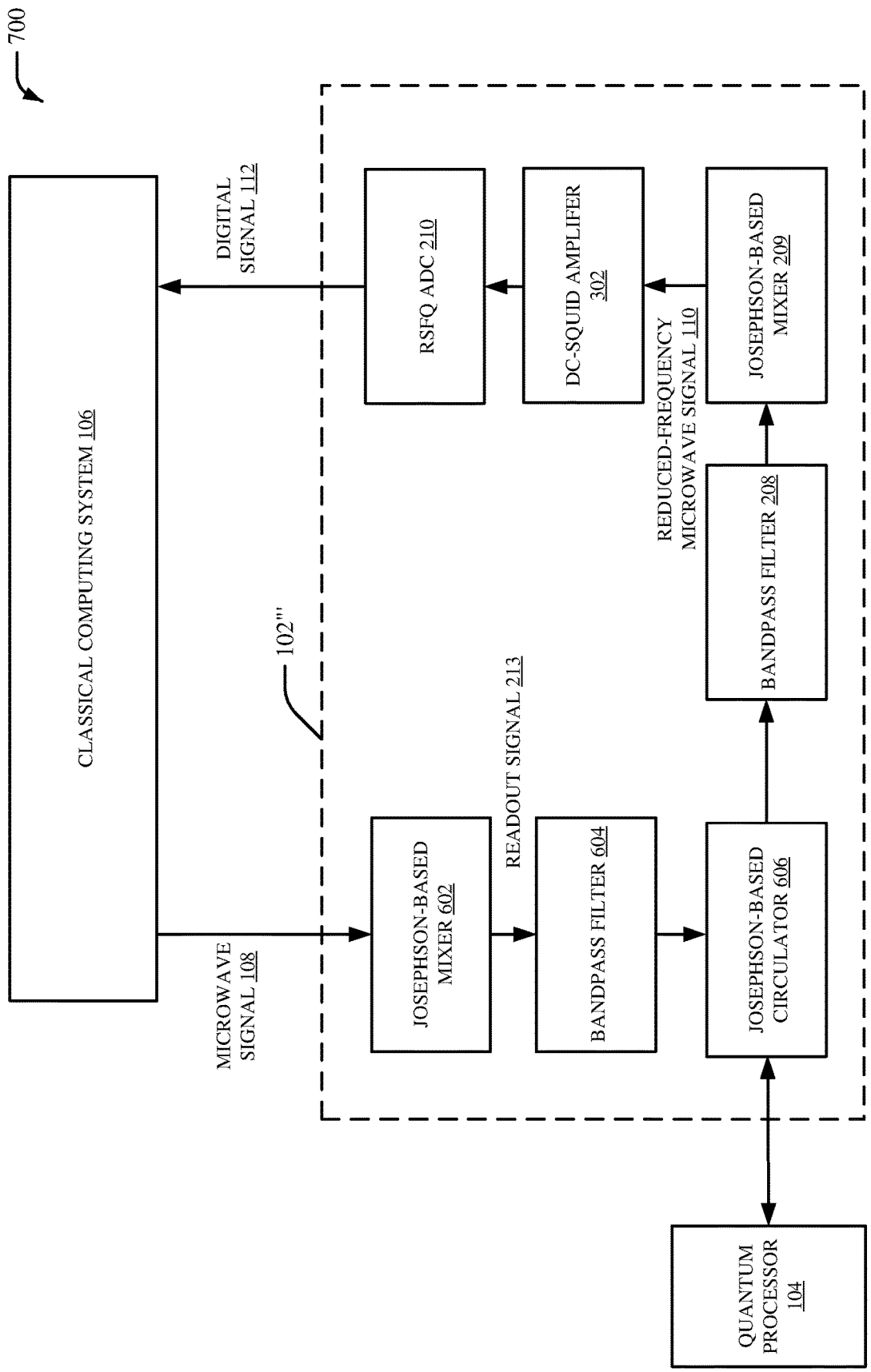
FIG. 7 illustrates yet another example, non-limiting system associated with a dilution refrigerator system, a quantum processor and a classical computing system in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 can include a dilution refrigerator system 102''', the quantum processor 104 and/or the classical computing system 106. The dilution refrigerator system 102''' can be an alternate embodiment of the dilution refrigerator system 102'. In an embodiment shown in FIG. 7, the dilution refrigerator system 102''' can include the Josephson-based mixer 602, the bandpass filter 604, the Josephson-based circulator 606, the bandpass filter 208, the Josephson-based mixer 209, the DC-SQUID amplifier and/or the RSFQ ADC 210. In an embodiment, the Josephson-based mixer 602, the bandpass filter 604, the Josephson-based circulator 606, the bandpass filter 208, the Josephson-based mixer 209, and/or the DC-SQUID amplifier can be mounted on a 10 mK stage of the dilution refrigerator system 102'''. Additionally or alternatively, the RSFQ ADC 210 can be mounted on a 4 K stage of the dilution refrigerator system 102'''. The microwave signal 108 generated by the classical computing system 106 can be provided to the dilution refrigerator system 102''' via an input transmission line for the dilution refrigerator system 102'''. In certain embodiments, the input transmission line for the dilution refrigerator system 102''' can include one or more attenuators and/or one or more filters (e.g., one or more lowpass filters) to attenuate and/or filter the microwave signal 108. In an embodiment, the microwave signal 108 can comprise a frequency that corresponds to a qubit resonant frequency and/or a readout resonant frequency associated with the quantum processor 104. For example, the microwave signal 108 can comprise a frequency that corresponds to a qubit resonant frequency of a superconducting qubit of the quantum processor 104. Additionally or alternatively, the microwave signal 108 can comprise a frequency that corresponds to a readout resonator of the quantum processor 104. In certain embodiments, the microwave signal 108 can additionally or alternatively control one or more portions of the quantum processor 104. For example, the microwave signal 108 can control one or more portions of the quantum processor 104 can control a superconducting qubit of the quantum processor 104. Additionally or alternatively, the microwave signal 108 can facilitate one or more quantum measurements associated with the quantum processor 104. For example, the microwave signal 108 can facilitate measurement of qubit information associated with the quantum processor 104. In one example, the qubit information can include information regarding a qubit state (e.g., an excited state, a ground state, or a superposition state) of a superconducting qubit of the quantum processor 104. The microwave signal 108 can be received by the Josephson-based mixer 602 of the dilution refrigerator system 102'''. The Josephson-based mixer 602 can facilitate transmission and/or generation of the microwave signal 108 based on a pump signal with a particular frequency. In an aspect, the Josephson-based mixer 602 can upconvert the microwave signal 108 into an increased-frequency microwave signal. For instance, the Josephson-based mixer 602 can upconvert the microwave signal 108 into the readout signal 213. In an embodiment, the Josephson-based mixer 602 can include a set of Josephson ring modulators that are coupled to one or more lumped-element resonators and/or one or more surface acoustic wave resonators to facilitate upconversion of the microwave signal 108 into the increased-frequency microwave signal. Accordingly, the readout signal 213 can be an upconverted readout output signal. In certain embodiments, the microwave signal 108 can additionally be filtered by the bandpass filter 604 centered around a particular frequency. For example, the bandpass filter 604 can allow a particular band of frequencies associated with the microwave signal 108 to pass through to the Josephson-based circulator 606. In an aspect, the bandpass filter 604 can transmit the microwave signal 108 with minimal loss and can block DC-signals and/or microwave signals below a threshold frequency.

The Josephson-based circulator 606 can be a circuit that facilitates a connection between the classical computing system 106, the quantum processor 104, and/or the Josephson directional amplifier 206. In an aspect, the Josephson-based circulator 606 can be a nonreciprocal microwave device. The Josephson-based circulator 606 can include three ports, in an implementation. In another implementation, the Josephson-based circulator 606 can include four ports. In an example, a signal that enters a port of the Josephson-based circulator 606 can be routed with low loss to another port of the Josephson-based circulator 606 based on a predefined circulation direction. In an implementation, the microwave signal 108 can be received by a first port of the Josephson-based circulator 606. Furthermore, the quantum processor 104 can be coupled to a second port of the Josephson-based circulator 606. A portion of the microwave signal 108 can be reflected off the quantum processor 104 (e.g., off a qubit resonator of the quantum processor 104) via the second port to provide a readout output signal associated with qubit information (e.g., a qubit measurement) associated with the quantum processor 104. The readout output signal can be transmitted via a third port of the Josephson-based circulator 606. In certain embodiments, a cold load can be coupled to the Josephson-based circulator 606 via a fourth port of the Josephson-based circulator 606. The cold load can be, for example, a 50 Ohm load. In an embodiment, the microwave signal 108 can be reflected off the quantum processor 104 via cQED. For example, a superconducting qubit of the quantum processor 104 can be dispersively coupled to a qubit resonator of the quantum processor 104. Furthermore, a qubit state can be determined based on a measured phase shift of the microwave signal 108 applied to the quantum processor 104. As such, the readout output signal provided by the quantum processor 104 can include qubit information such as a qubit measurement, a qubit state, and/or other qubit information. In an aspect, the Josephson-based circulator 606 can block excess backaction of the DC-SQUID amplifier 302 on the qubit information associated with the readout output signal. In an embodiment, the Josephson-based circulator 606 can be implemented without magnetic materials and/or strong magnetic fields. In another embodiment, the Josephson-based circulator 606 can include a set of Josephson parametric converters.

The bandpass filter 208 can further process the readout output signal provided by the quantum processor 104 (e.g., the readout output signal associated with the microwave signal 108). In an aspect, the readout output signal can additionally be filtered by the bandpass filter 208 centered around a particular frequency. In an example, the bandpass filter 208 can allow a particular band of frequencies associated with the readout output signal to pass through to the Josephson-based mixer 209. In an aspect, the bandpass filter 208 can transmit the readout output signal with minimal loss and can block DC-signals and/or microwave signals below a threshold frequency. The Josephson-based mixer 209 can convert the readout output signal into the reduced-frequency microwave signal 110. The reduced-frequency microwave signal 110 can comprise a frequency that is lower than a frequency of the readout output signal and a frequency of the microwave signal 108. For example, the reduced-frequency microwave signal 110 can comprise a frequency that is lower than a frequency of the superconducting qubit of the quantum processor 104 and a frequency of the qubit resonator of the quantum processor 104. In an embodiment, the Josephson-based mixer 209 can include a set of Josephson ring modulators that are coupled to one or more lumped-element resonators and/or one or more surface acoustic wave resonators to facilitate downconversion of the readout output signal associated with the microwave signal 108 into the reduced-frequency microwave signal 110. Accordingly, the reduced-frequency microwave signal 110 can be a downconverted readout output signal (e.g., a downconverted version of the readout output signal). The DC-SQUID amplifier 302 can amplify the reduced-frequency microwave signal 110. The DC-SQUID amplifier 302 can be a quantum-limited amplifier or a near quantum-limited amplifier. In an embodiment, the DC-SQUID amplifier 302 can comprise two Josephson junctions in parallel in a superconducting loop to facilitate amplification of the reduced-frequency microwave signal 110. In an embodiment, an amplified version of the reduced-frequency microwave signal 110 generated by the DC-SQUID amplifier 302 can be filtered by a lowpass filter. For example, an output line between a 10 mK stage of the dilution refrigerator system 102 and a 4 K stage of the dilution refrigerator system 102 can include a lowpass filter between the DC-SQUID amplifier 302 and the RSFQ ADC 210. The lowpass filter can reject high-frequency signals and/or noise above a cutoff frequency for the lowpass filter. Furthermore, the RSFQ ADC 210 can generate the digital signal 112 based on the amplified version of the reduced-frequency microwave signal 110. For instance, the RSFQ ADC 210 can sample and/or digitize the amplified version of the reduced-frequency microwave signal 110 to generate the digital signal 112. As such, the digital signal 112 can include an encoded version of the qubit information included in the readout output signal, where the qubit information included in the digital signal 112 is encoded using a sequence of binary bits. In an embodiment, the RSFQ ADC 210 can employ single flux quantum voltage pulses generated by Josephson junctions to convert the amplified version of the reduced-frequency microwave signal 110 into the digital signal 112. The digital signal 112 generated by the RSFQ ADC 210 can be provided to the classical computing system 106 via an output transmission line for the dilution refrigerator system 102'''. In certain embodiments, the output transmission line for the dilution refrigerator system 102''' can include one or more attenuators and/or one or more filters to attenuate and/or filter the digital signal 112. In certain embodiments, the RSFQ ADC 210 can be an ERSFQ ADC or an eSFQ ADC. In certain embodiments, the RSFQ ADC 210 and/or the lowpass filter that filters the reduced-frequency microwave signal 110 can be located on an output transmission line for the dilution refrigerator system 102'''.

It is to be appreciated that the system 700 can provide various advantages as compared to conventional dilution refrigerator systems. For instance, by employing the system 700, hardware overhead for a dilution refrigerator system associated with a quantum processor can be reduced. The reduced hardware overhead can also promote scalability for the dilution refrigerator system. Additionally, heat load and/or mass load within a dilution refrigerator system can be reduced. Power consumption for a dilution refrigerator system associated with a quantum processor can also be reduced. Moreover, by employing the system 700, performance and/or accuracy of a quantum processor associated with a dilution refrigerator system can be improved.

Figure 8:
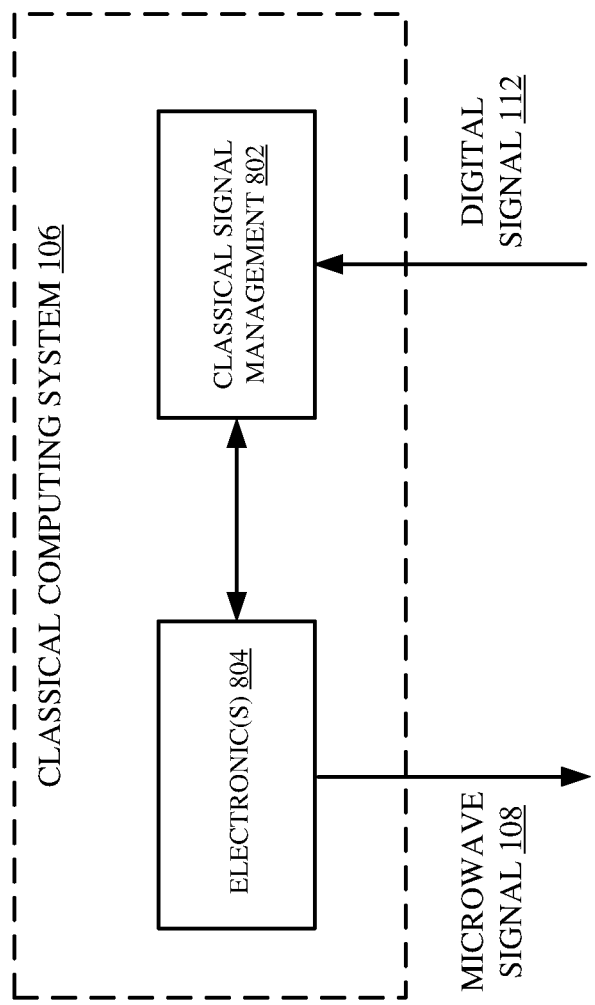
FIG. 8 illustrates an example, non-limiting system associated with a classical computing system in accordance with one or more embodiments described herein.

FIG. 8 illustrates a block diagram of an example, non-limiting system 800 in accordance with one or more embodiments described herein. Repetitive description of like elements employed in other embodiments described herein is omitted for sake of brevity.

The system 800 includes the classical computing system 106. The classical computing system 106 can be communicatively coupled to the dilution refrigerator system 102, the dilution refrigerator system 102', the dilution refrigerator system 102'', or the dilution refrigerator system 102'''. In an embodiment shown in FIG. 8, the classical computing system 106 can include classical signal management 802 and/or one or more electronics 804. The classical signal management 802 can be communicatively coupled to the one or more electronics 804. The classical signal management 802 and/or the one or more electronics 804 can be operated, for example, in a computing environment at room-temperature (e.g., at approximately 273K). The classical signal management 802 can perform classical signal processing associated with the digital signal 112. The classical signal management 802 can additionally or alternatively perform signal analysis associated with the digital signal 112. Furthermore, the classical computing system 106 can additionally or alternatively manage storage of data (e.g., bits) associated with the digital signal 112. The one or more electronics 804 can generate the microwave signal 108 and/or can transmit the microwave signal 108 to the dilution refrigerator system 102, the dilution refrigerator system 102', the dilution refrigerator system 102'', or the dilution refrigerator system 102'''. In an embodiment, the one or more electronics 804 can be one or more signal generators. In certain embodiments, the classical signal management 802 and the one or more electronics 804 can exchange one or more analog signals and/or one or more digital signals. In certain embodiments, the classical signal management 802 and/or the one or more electronics 804 can control one or more functions associated with the RSFQ logic 402 and/or the RSFQ DAC 404. In certain embodiments, the classical signal management 802 and/or the one or more electronics 804 can transmit one or more analog signals to the RSFQ logic 402 and/or the RSFQ DAC 404.

Figure 9:
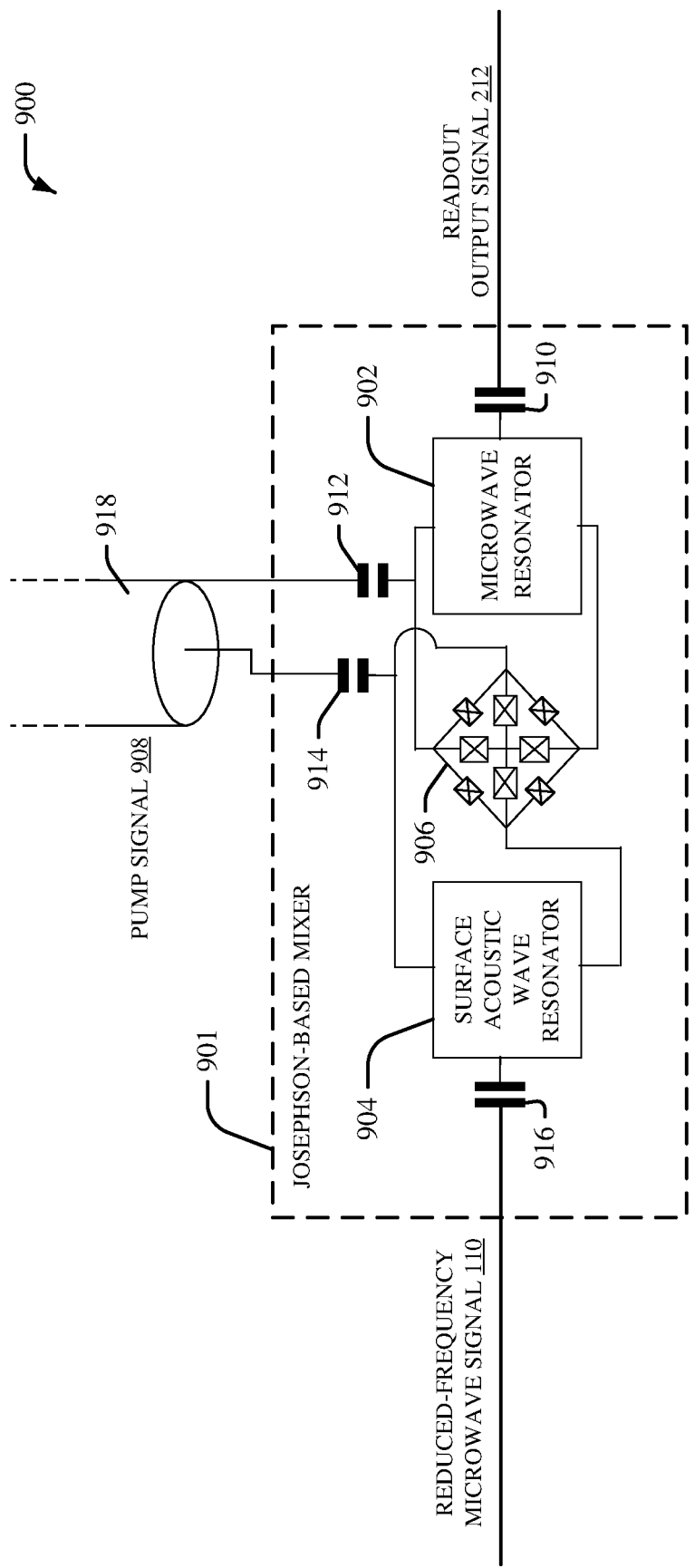
FIG. 9 illustrates an example, non-limiting system associated with a Josephson-based mixer in accordance with one or more embodiments described herein.

FIG. 9 illustrates a block diagram of an example, non-limiting system 900 in accordance with one or more embodiments described herein. Repetitive description of like elements employed in other embodiments described herein is omitted for sake of brevity.

The system 900 includes a Josephson-based mixer 901. The Josephson-based mixer 901 can correspond to the Josephson-based mixer 209, for example. However, in another example, the Josephson-based mixer 901 can correspond to the Josephson-based mixer 602. The Josephson-based mixer 901 can include a microwave resonator 902, a surface acoustic wave resonator 904 and a Josephson ring modulator 906. The microwave resonator 902 can be a microwave resonator which can resonate at particular microwave frequencies. The surface acoustic wave resonator 904 can be an electro-mechanical resonator which can resonate one or more different microwave frequencies than the microwave resonator. In an aspect, the microwave resonator 902 can comprise a first resonance frequency and the surface acoustic wave resonator 904 can comprise a second resonance frequency. The Josephson ring modulator 906 can comprise a set of Josephson tunnel junctions. For example, the Josephson ring modulator 906 can comprise a set of Josephson junctions arranged in a Wheatstone-bridge configuration. Additionally or alternatively, the Josephson ring modulator 906 can comprise a set of shunt junctions. In an embodiment, a pump signal 908 can be utilized to control frequency downconversion of the readout output signal 212 into the reduced-frequency microwave signal 110 via the microwave resonator 902, the surface acoustic wave resonator 904 and the Josephson ring modulator 906, for example. In certain embodiments, the Josephson-based mixer 901 can include a coupling capacitor 910, a coupling capacitor 912, a coupling capacitor 914 and/or a coupling capacitor 916 to facilitate one or more couplings between the microwave resonator 902, the surface acoustic wave resonator 904 and/or the Josephson ring modulator 906. The coupling capacitor 910, the coupling capacitor 912, the coupling capacitor 914 and/or the coupling capacitor 916 can additionally or alternatively facilitate processing of the readout output signal 212, the reduced-frequency microwave signal 110 and/or the pump signal 908. For example, the coupling capacitor 916 can couple an external transmission line carrying the reduced-frequency microwave signal 110 to the surface acoustic wave resonator 904. The coupling capacitor 910 can couple an external transmission line carrying the readout output signal 212 to the microwave resonator 902. The coupling capacitor 912 and/or the coupling capacitor 914 can couple a transmission line 918 carrying input and output pump drive to a Josephson ring modulator, for example.

Figure 10:
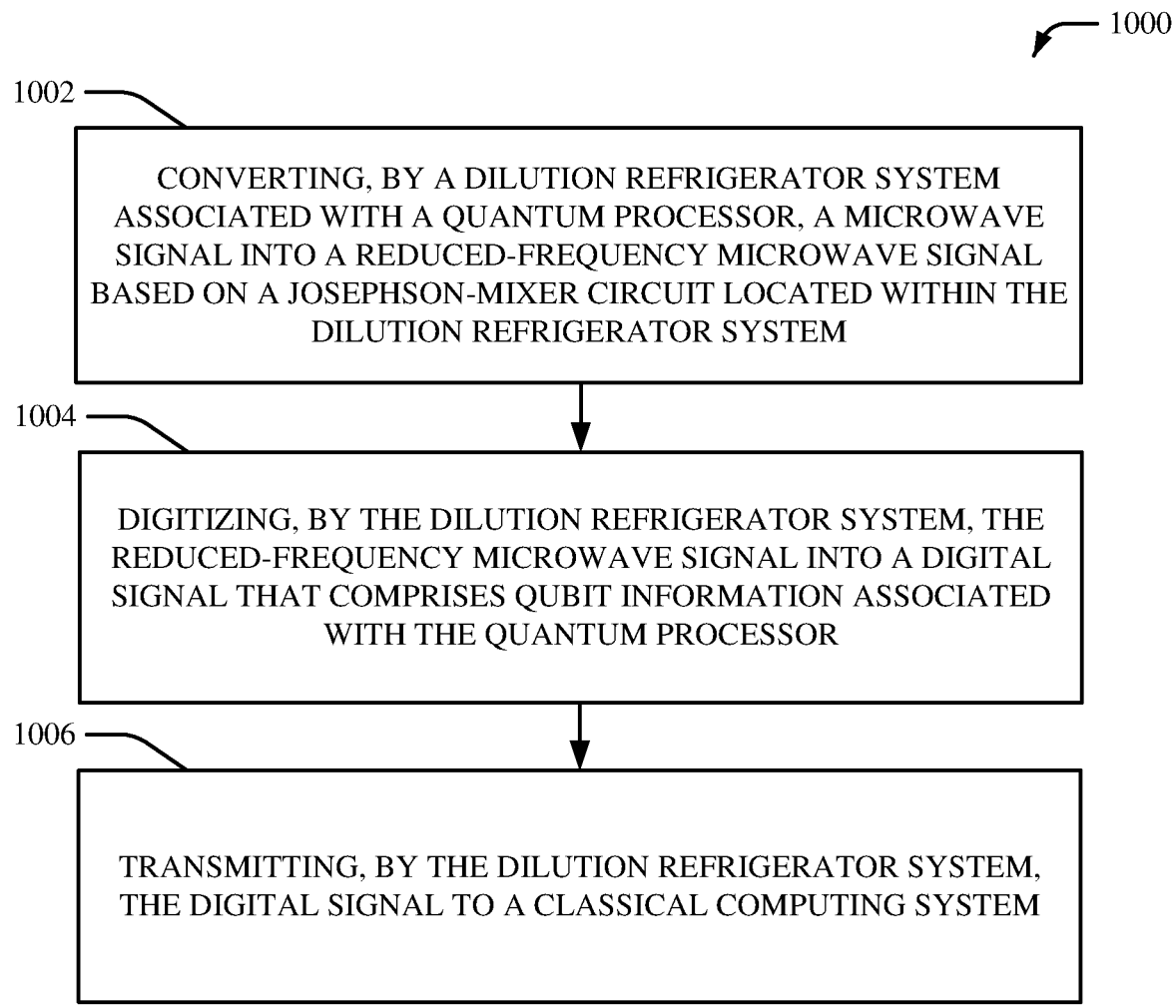
FIG. 10 illustrates a flow diagram of an example, non-limiting computer-implemented method for providing an improved dilution refrigerator for a superconducting quantum processor in accordance with one or more embodiments described herein.

FIG. 10 illustrates a flow diagram of an example, non-limiting method 1000 for providing an improved dilution refrigerator for a superconducting quantum processor in accordance with one or more embodiments described herein. At 1002, a microwave signal is converted, by a dilution refrigerator system associated with a quantum processor, into a reduced-frequency microwave signal based on a Josephson-mixer circuit located within the dilution refrigerator system. At 1004, the reduced-frequency microwave signal is digitized, by the dilution refrigerator system, into a digital signal that comprises qubit information associated with the quantum processor. At 1004, the digital signal is transmitted, by the dilution refrigerator system, to a classical computing system. In certain embodiments, the method 1000 can additionally or alternatively include receiving, by the dilution refrigerator system, the microwave signal from the classical computing system. In certain embodiments, the method 1000 can additionally or alternatively include amplifying, by the dilution refrigerator system, the microwave signal via a Josephson directional amplifier located within the dilution refrigerator system. In certain embodiments, the method 1000 can additionally or alternatively include isolating, by the dilution refrigerator system, the quantum processor from noise via a Josephson-based isolator located within the dilution refrigerator system. In certain embodiments, the method 1000 can additionally or alternatively include protecting, by the dilution refrigerator system, the quantum processor from noise associated with an output chain of the dilution refrigerator system using a Josephson-based isolator located within the dilution refrigerator system.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events.

Moreover, because at least converting a microwave signal into a reduced-frequency microwave signal, digitizing a reduced-frequency microwave signal, etc. are established from a combination of electrical and mechanical components and circuitry, a human is unable to replicate or perform processing performed by systems and/or devices disclosed herein. For example, a human is unable to convert a microwave signal into a reduced-frequency microwave signal. Furthermore, a human is unable to digitize a reduced-frequency microwave signal.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising: a dilution refrigerator for a quantum processor, wherein the dilution refrigerator comprises:
    a first Josephson mixer circuit configured to upconvert an input microwave signal comprising a first frequency from a classical computing system via an input transmission line to a qubit readout signal comprising a second frequency in a defined range of a readout resonance frequency for performing a qubit readout to obtain a qubit measurement associated with the quantum processor, wherein the first Josephson mixer circuit comprises a Josephson ring modulator coupled to a lumped-element microwave resonator and a surface acoustic wave resonator, and wherein the lumped-element microwave resonator resonates at a first resonance frequency that is different from a second resonance frequency at which the surface acoustic wave resonator resonates;
    a Josephson based circulator coupled to the quantum processor, wherein the Josephson based circulator is configured to:
        route the qubit readout signal to the quantum processor, wherein a portion of the qubit readout signal is reflected off of the quantum processor to produce a readout output signal associated with qubit information from the quantum processor, and
        route the readout output signal towards a second Josephson mixer circuit; and
    the second Josephson mixer circuit is configured to:
    convert the readout output signal to a reduced-frequency microwave signal having a third frequency that is lower than the second frequency, and route the reduced-frequency microwave signal towards an output transmission line coupled to the classical computing system;
    wherein frequency increases performed by the first Josephson mixer circuit and frequency decreases performed by the second Josephson mixer circuit improve accuracy of the qubit measurement associated with the quantum processor.

2. The system of claim 1, wherein the dilution refrigerator further comprises a rapid single flux quantum (RSFQ) analog-to-digital converter (ADC) that digitizes the reduced-frequency microwave signal based on a superconducting device to generate a digital signal for the classical computing system, wherein the second Josephson mixer circuit is located at a 10 mK stage within the dilution refrigerator and the RSFQ ADC is located at a 4K stage within the dilution refrigerator.

3. The system of claim 2, wherein the dilution refrigerator further comprises a near quantum-limited amplifier that amplifies the reduced-frequency microwave signal to generate an amplified version of the reduced-frequency microwave signal for processing by the RSFQ ADC.

4. The system of claim 2, wherein the dilution refrigerator further comprises a lowpass filter that transmits the reduced-frequency microwave signal with minimal loss for processing by the RSFQ ADC.

5. The system of claim 1, wherein the dilution refrigerator further comprises a quantum-limited amplifier that amplifies the readout output signal to generate an amplified version of the readout output signal for processing by the second Josephson mixer circuit.

6. The system of claim 1, wherein the dilution refrigerator further comprises a bandpass filter that filters the readout output signal based on a band of frequencies to generate a filtered version of the readout output signal for processing by the second Josephson mixer circuit.

7. The system of claim 1, wherein the system further comprises: the classical computing system that comprises an electronic device that generates the input microwave signal.

8. The system of claim 1, wherein the first Josephson mixer circuit is located at a 4 mK stage within the dilution refrigerator.

9. The system of claim 1, wherein the second Josephson mixer circuit is located at a 10 mK stage within the dilution refrigerator.

10. The system of claim 1, wherein the second Josephson mixer circuit comprises another Josephson ring modulator coupled to another lumped-element microwave resonator and another surface acoustic wave resonator, wherein the other lumped-element microwave resonator resonates at a third resonance frequency that is different from a fourth resonance frequency at which the other surface acoustic wave resonator resonates.

11. The system of claim 1, wherein the readout resonance frequency is based on a readout frequency of a readout resonator of the quantum processor.

12. The system of claim 1, wherein the readout resonance frequency is based on a qubit frequency of a qubit of the quantum processor.

13. The system of claim 1, wherein the third frequency of the reduced-frequency microwave signal is less than a qubit frequency of a qubit of the quantum processor and a readout frequency of a qubit resonator of the quantum processor.

* * * * *